United States Patent
Regunathan et al.

(10) Patent No.: US 11,336,562 B2
(45) Date of Patent: May 17, 2022

(54) SYSTEM AND METHOD FOR GENERIC DIVERSITY GATEWAY SWITCHING FOR A SATELLITE COMMUNICATION SYSTEM

(71) Applicant: Hughes Network Systems, LLC, Germantown, MD (US)

(72) Inventors: Murali Regunathan, Germantown, MD (US); David Alan Roos, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 87 days.

(21) Appl. No.: 16/532,485

(22) Filed: Aug. 6, 2019

(65) Prior Publication Data

US 2021/0044515 A1    Feb. 11, 2021

(51) Int. Cl.
*H04L 45/00* (2022.01)
*H04L 45/12* (2022.01)
*H04L 69/40* (2022.01)

(52) U.S. Cl.
CPC ............. *H04L 45/22* (2013.01); *H04L 45/04* (2013.01); *H04L 45/123* (2013.01); *H04L 69/40* (2013.01)

(58) Field of Classification Search
CPC ....... H04L 45/22; H04L 45/04; H04L 45/123; H04L 69/40
USPC ......................................................... 370/392
See application file for complete search history.

(56) References Cited

U.S. PATENT DOCUMENTS

| | | | |
|---|---|---|---|
| 6,219,546 B1 | 4/2001 | Valentine et al. | |
| 2013/0109299 A1 | 5/2013 | Roos et al. | |
| 2016/0286462 A1* | 9/2016 | Gohite | H04W 40/12 |
| 2017/0118067 A1* | 4/2017 | Vedula | H04L 61/103 |

FOREIGN PATENT DOCUMENTS

EP    2911341 A1    8/2015

OTHER PUBLICATIONS

International Search Report and Written Opinion dated Nov. 20, 2020 by the International Searching Authority (European Patent Office) in PCT Application PCT/US2020/045131.

* cited by examiner

*Primary Examiner* — Kibrom T Hailu
*Assistant Examiner* — Nizam U Ahmed
(74) *Attorney, Agent, or Firm* — NovoTechIP International PLLC

(57) ABSTRACT

Systems and methods are described, and one method includes storing, in association with a backup gateway resource, a first and second primary to backup (P2B) pairing coefficient, and a first and second backup to primary (B2P) pairing coefficient. The first and second P2B pairing coefficients correspond to a first and second P2B pairing, respectively. The first and second B2P pairing coefficients are indicative of a metric of switching from the backup GWR to the first and second primary GWRs. A respective unavailability metric is received from the first primary GWR, second primary GWR, respectively, and backup GWR. A P2B pairing is selected selecting, based at least partially on the first and second P2B pairing coefficients, and first and the second B2P pairing coefficients. Traffic is switched to the backup GWR from the one of the first primary and second primary GWR corresponding to the selected P2B pairing.

20 Claims, 8 Drawing Sheets

SYSTEM AND METHOD FOR GENERIC DIVERSITY GATEWAY SWITCHING FOR A SATELLITE COMMUNICATION SYSTEM

BACKGROUND

Rain fade at a satellite ground station, or gateway, may reduce service availability for users in user spot beams served by that gateway. Signal degradation due to rain fade may be partially mitigated, for example, through application of adaptive coding and modulation (ACM) techniques. Such techniques, though, can reduce link capacity. Another mitigation technique is uplink power control (ULPC) at gateway radio frequency terminals (RFTs), which can compensate for rain fade attenuation by increasing uplink transmit power. Yet another technique is larger antennas in the RFT, which can provide some compensation for both uplink and downlink attenuation. However, large antennas and higher power amplifiers can be expensive. Also, even when coupled with ACM, the larger antennas and increased power may not provide target service availability, especially at gateway sites having heavy rain.

Gateway diversity replicates at a second gateway site some or all of the equipment extant at a first gateway site. There are various gateway diversity architectures. One architecture includes a "backup" gateway for every "primary" gateway. Another architecture provides an M:N ratio, for reasons such as the cost of maintaining an often idle resource of backup gateways.

Substantial resources can be expended in switching from a primary gateway to a backup gateway. Therefore, false triggering of such switching can be costly, in addition to removing a backup gateway from the inventory of backup gateways available to the system. Another cost issue in gateway diversity can be delay in switching.

SUMMARY

This Summary identifies example features and aspects and is not an exclusive or exhaustive description of the disclosed subject matter. In or omitted from this Summary is not intended as indicative of relative importance of such features.

Additional features and aspects are described, and others will become apparent to persons skilled in the art upon reading the following detailed description and viewing the drawings that form a part thereof.

An example of disclosed systems can include a processor and a memory coupled to the processor, the memory storing instructions that when executed by the processor can cause the processor to store, in association with a backup GWR (gateway resource), a first P2B (primary to backup) pairing coefficient, and a second P2B pairing coefficient, wherein the first P2B pairing coefficient can correspond to a first P2B pairing, from a first primary GWR to the backup GWR, and the second P2B pairing coefficient can correspond to a second P2B pairing, from a second primary GWR to the backup GWR, and to store, in association with the backup GWR, a first B2P (backup to primary to backup) pairing coefficient and a second B2P pairing coefficient, in which the first B2P pairing coefficient can be indicative of a metric of switching from the backup GWR to the first primary GWR, and the second B2P pairing coefficient can be indicative of a metric of switching from the backup GWR to the second primary GWR, and to receive a first unavailability metric and a second unavailability metric, from the first primary GWR and the second primary GWR, respectively, and a third unavailability metric from the backup GWR; and to select, responsive at least in part to a conjunction of the first unavailability metric and the second unavailability metric exceeding respective GWR thresholds, a selected P2B pairing among the first P2B pairing and the second P2B pairing, wherein the selecting can based at least partially on the first P2B pairing coefficient, the second P2B pairing coefficient, the first B2P pairing coefficient, and the second B2P pairing coefficient; and to switch a traffic to the backup GWR from the one among the first primary GWR and second primary GWR that corresponds to the selected P2B pairing.

An example of disclosed methods can include storing, in association with a backup GWR a first P2B pairing coefficient, a second P2B pairing coefficient, a first B2P pairing coefficient, and a second B2P pairing coefficient, wherein the first P2B pairing coefficient can correspond to a first P2B pairing, from a first primary GWR to the backup GWR, and the second P2B pairing coefficient can correspond to a second P2B pairing, from a second primary GWR to the backup GWR, and the first B2P pairing coefficient can be indicative of a metric of switching from the backup GWR to the first primary GWR, and the second B2P pairing coefficient can be indicative of a metric of switching from the backup GWR to the second primary GWR, and this and other examples of disclosed methods can also include receiving a first unavailability metric and a second unavailability metric, from the first primary GWR and the second primary GWR, respectively, and a third unavailability metric from the backup GWR, and can include selecting, responsive at least in part to a conjunction of the first unavailability metric and the second unavailability metric exceeding respective GWR thresholds, a selected P2B pairing among the first P2B pairing and the second P2B pairing, and such selecting can be based at least partially on the first P2B pairing coefficient, the second P2B pairing coefficient, the first B2P pairing coefficient, and the second B2P pairing coefficient; and can include switching a traffic to the backup GWR from the one among the first primary GWR and second primary GWR that corresponds to the selected P2B pairing.

An example of disclosed systems can include a processor; and a memory, coupled to the processor, that stores executable instructions that, when executed by the processor, cause the processor to store, in association with each of a plurality of GWRs a plurality of pairing coefficients, each of the pairing coefficients corresponding to a pairing of the GWR to a different other GWR among the plurality of GWRs, and to receive a plurality of performance metrics, each from a corresponding one of the GWRs, each of which can reflect reflecting a weighted sum of current values for each of a plurality of different component metrics for the GWR, and to select, in response to the received performance metric from each of a plurality of the GWRs exceeding a corresponding threshold, R GWRs from which to switch traffic, R being an integer and to select, for each of the R GWRs, a corresponding backup GWR from among other of the GWRs; and to switch traffic, from a GWR among the R GWRs, over to the GWR's corresponding backup GWR. The selection for each of the R GWRs, of its corresponding backup GWR can be based at least in part on a comparison of the pairing coefficient for the pairing of the GWR to its corresponding backup GWR in relation to the pairing of the GWR to other of the GWRs.

BRIEF DESCRIPTION OF THE DRAWINGS

The drawings and figures depict various implementations in accordance with the present teachings, by way of example, not by way of limitation. In the figures, like reference numerals refer to the same or similar elements. For purposes of convenience the drawings are not necessarily made to scale.

DETAILED DESCRIPTION

In the following detailed description, numerous specific details are set forth by way of examples in order to provide a thorough understanding of the relevant teachings. However, it will be apparent that the present teachings may be practiced without such details. In other instances, well known methods, procedures, components, and/or circuitry have been described at a relatively high-level, without detail, to avoid unnecessarily obscuring aspects of the present teachings.

An example implementation can include receiving, from each of a plurality of gateway resources, a current value of a metric, which can be composite metric formed, for example as a weighted sum of current values of each of a plurality of different performance metrics. For convenience, the metric is referenced in this disclosure as "unavailability metric." It will be understood that "unavailability metric" has no intrinsic meaning with respect to definition or scope of the named metric. An implementation can include storing, for each gateway resource among a plurality of gateway resources, a plurality of pairing coefficients, one for each other gateway resource that can be switched-in for that gateway resource. For each gateway resource, its pairing coefficients can be a metric for primary-backup pairing between that gateway resource and another of the gateway resources, which can be indicative of desirability, as well as impossibility, of the pairing. The pairing coefficient can be based on plurality of system factors, e.g., performance costs, of switching from the pair's primary gateway resource to the pair's backup gateway resource.

An implementation can also include determining, in response to a primary gateway resource's unavailability metric exceeding a switching threshold, an optimum backup gateway resource, based on applying selection processes to the pairing coefficients for primary-backup pairings of that primary gateway resource with other of the gateway resources. The selection processes can drive selection toward system resource maximation or system cost minimization, or combination thereof.

Additional features can include, but are not limited to, prioritization in pairings to limited backup gateway resources, hysteresis switching logic for reduction in repeated short duration switching, an prediction based switching to reduce switching-in time.

Figure 1:
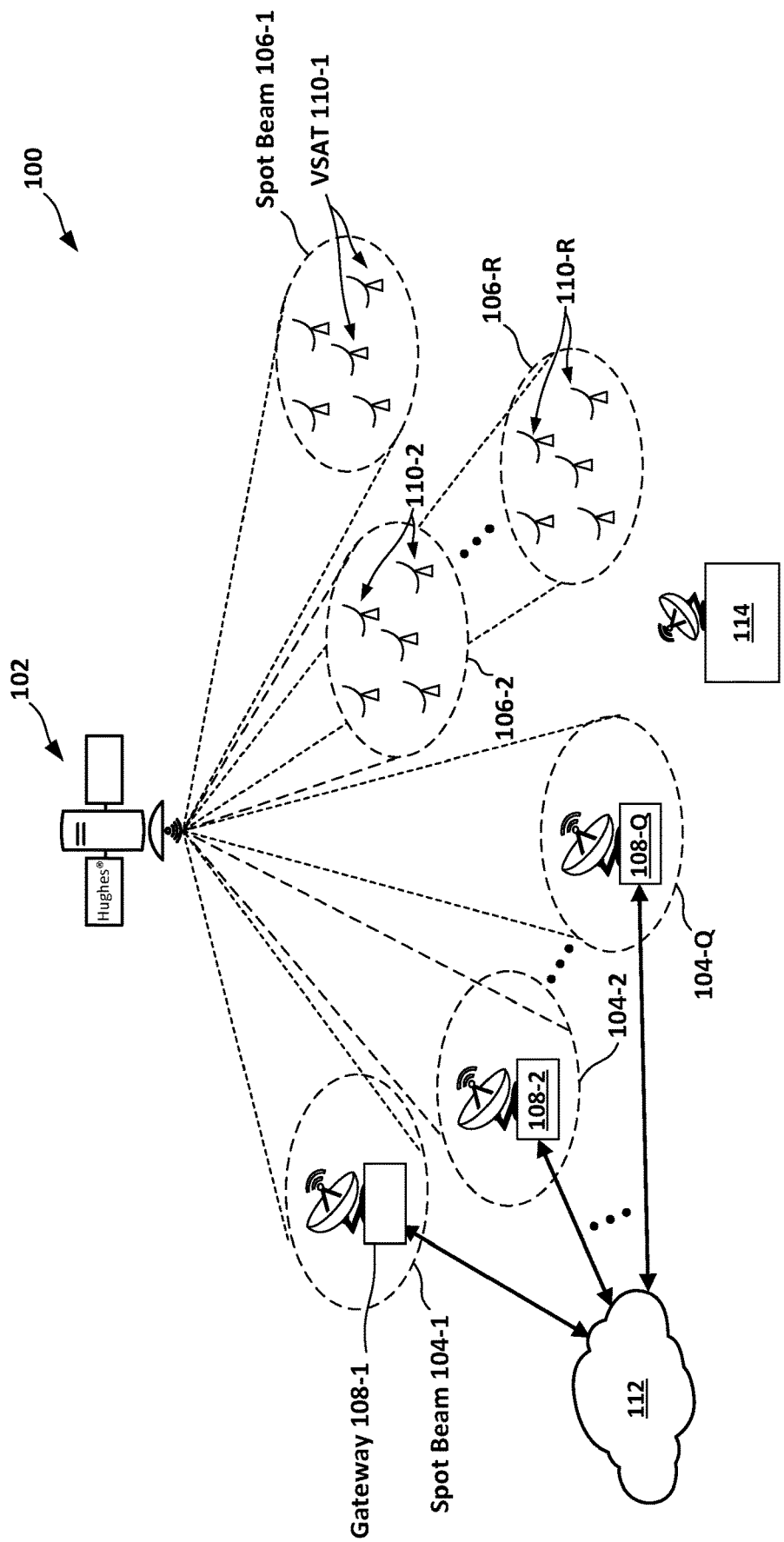
FIG. 1 is a high level diagram of a satellite communication system.

FIG. 1 is a high level functional schematic of relevant portions of a satellite communications system 100 (hereinafter "SC system 100"). The SC system 100 can include a satellite 102 providing a first plurality of spot beams 104-1, 104-2, ..., 104-0 (generically "first spot beam(s) 104"), and a second plurality of spot beams 106-1, 106-2, ..., 106-R (generically "second spot beam(s) 106"). Satellite gateways (hereinafter "GWs"), such as the FIG. 1 first GW 108-1, second GW 108-2, ..., on through to $Q^{th}$ GW 108-Q (generically "GW(s) 108"), can be positioned in each of the first spot beams 104. The first spot beams 104 will therefore be alternatively referenced, collectively, as "GW spot beams" 104. A respective plurality of Very Small Aperture Terminals (VSATs) can be positioned within each of the second spot beams 106, for example, first VSATs 110-1 within the first VSAT spot beam 106-1, second VSATs 110-2 within the second VSAT spot beam 106-2, and so on, to a plurality of $R^{th}$ VSATs 110-R within the $R^{th}$ VSAT spot beam 106-R. For brevity, VSATs 110-1, 110-2, ..., 110-R will be referenced collectively as "VSATs 110," and the second spot beams 106 will be alternatively referenced, collectively, as "VSAT spot beams" 106.

The GWs 108 can connect to a wide area network (WAN) 112, for example, the Internet. End user equipment (not explicitly visible in FIG. 1), e.g., general purpose personal computers (PCs), tablet devices, and smart phones supporting Web browsers, can connect to the VSATs 110, and therefore to the WAN (hereinafter "Internet") 112, via uplink and downlink between the VSAT 110 and the satellite 102, and uplink and downlink between the satellite 102 and the GWs 108. The SC system 100 therefore provides a "bent pipe" connectivity between GWs 108 and VSATs 110 and, ultimately, between end user equipment and the Internet 112.

A telemetry, tracking and control (TT&C) station 114 can monitor and control operations of the satellite 102, including, for example, maintaining pointing directions of the GW spot beams 104 and VSAT spot beams 106.

In operation, signal integrity of the links between any of the gateways 108 and the satellite 102 can be degraded due to rain, or by loss of equipment performance, or both. The degradation due to rain can be referred to as "rain fade." Absent mitigation, the VSATs 110 in the one or more VSAT spot beams 106 serviced by such gateways 108 can lose service.

One mitigation technique to maintain service to the VSATs 110 is "diversity gateway switching." In overview, with diversity gateway switching, when a gateway 108 experiences rain fade or other degradation, the system switches that gateway's traffic to a backup gateway. Referring to FIG. 1, in an example implementation of diversity gateway switching, one or more of the GWs 108 can be designated as "backup" GWs 108, and other among the gateways 108 can be "primary" gateways 108. Backup GWs 108 and primary GWs 108 can each have their own gateway spotbeams 104. Alternatively, not visible in FIG. 1, both a primary GW 108 and a backup GW 108 can be within the same gateway spot beam 104, separated by sufficient distance such that statistical likelihood of both being affected by rain fade is acceptably low.

The phrase "as used herein," as used in the present disclosure, means "as used herein except where explicitly stated otherwise or made clear from its context to have a different meaning."

Substantial resources of the SC system 100 can be expended in switching from a primary GW 108 to a backup GW 108. Therefore, false triggering of such switching can be costly. False triggering also needlessly removes a backup gateway 108 from the inventory of backup GWs 108 available to the SC system 100. Another cost issue is delay in switching. One source of false triggering can be short-term rain fade, having a duration short enough that SC system 100 resources other than diversity gateway switching may maintain acceptable service to the VSATs 110. Examples of such resources can include increasing satellite 102 transmission power, or gateway 108 transmission power, or both. Therefore, technical need exists for avoiding diversity gateway switching due to rain fade having a duration that is system-tolerable.

Another technical issue with diversity gateway switching can relate to the ratio of backup GWs 108 to primary GWs 108 being lower than 1:1. Such system configurations are common, because of the cost of maintaining an often idle resource of backup gateways.

As used herein, the term "switching-back" means the process of a primary gateway or gateway resource switching-in for itself to become the switched-in gateway or gateway resource.

Systems and methods according to this disclosure address the above-identified technical issues. Features include, without limitation, improved, novel detection of gateway resource performance, which can in turn provide improvement in switch decisions. Features also include a system impact analytic pairing of primary gateway resources-to-backup gateway resources, based on minimum cost/maximum system resource utilization. Further features include pairing selection processes being generic to multiple backup gateway architectures. Technical features also include, but are not limited to, an efficient prioritization of switching order when multiple gateway resources experience unacceptable degradation in performance and backup gateway resources are not sufficient to allow all of such primary gateway resources to switch. Technical features also include switching logic that can reduce false triggering and "false negatives," and adaptation to seasonal variations of rain fade.

The phrase "gateway resource," as used herein has a meaning that includes an entire satellite gateway, a communication channel carried by one satellite gateway, and a channel or virtual channel statically assigned to or dynamically distributed to or among any one more satellite gateways.

As used herein, the term "diversity state," in a context such as "diversity state of a gateway" or "gateway resource" means the state of a satellite gateway or gateway resource between being "switched-in," which means active in carrying end user traffic, and being "switched-out", which means inactive and not carrying end user traffic.

As used herein, the term "switching-in" means a transition phase of switching between one gateway or gateway resource and another gateway or gateway resource. Switching-in, as use herein, encompasses both a backup gateway resource switching-in for a primary gateway resource and a primary gateway resource switching back in for itself.

Figure 2:
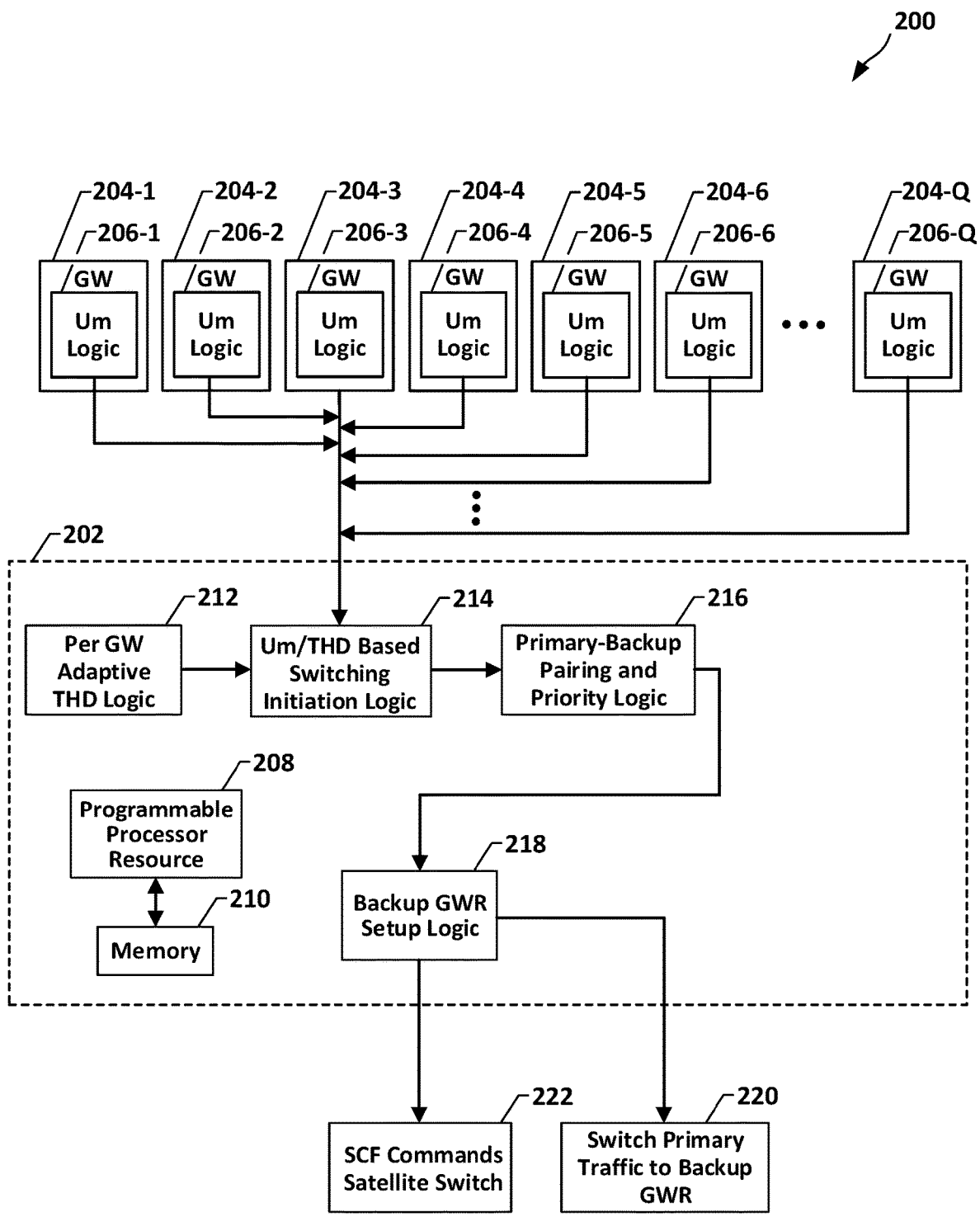
FIG. 2 is a functional block diagram of one example implementation of an unavailability based, generic gateway switching system according to the present disclosure.

FIG. 2 is a functional block diagram of one example implementation of an unavailability metric based, generic gateway switching system 200 according to the present disclosure. For brevity, a coined abbreviation, "UMB" is introduced here as an alternative, abbreviated form for reciting "unavailability metric based." It will be understood that "UMB" has no intrinsic meaning as used in this disclosure.

The UMB gateway diversity system 200 can include a central diversity controller 202 connected to GW resources (GWRs) 204-1, GWR 204-2, GWR 204-3, GWR 204-4, GWR 204-5, GWR 204-6, and so on, through $Q^{th}$ GWR 204-Q (generically "GWR 204" or "GWRs 204"). Each GWR 204 can be an entire satellite gateway. In addition, one or more GWRs 204 can be gateway channels, and each of such gateway channels can be entirely carried by one satellite gateway or can be distributed over a plurality of satellite gateways.

Each of the GWRs 204 can include a Um logic 206. The Um logic 206 can be configured to determine Um based at least partially on a weighted sum, as described in greater detail later. In implementations where the GWR 204 is a gateway channel that is carried by one satellite gateway, the Um logic 206 can be implemented on the satellite gateway and configured to compute a different Um for each of the one or more GWRs 204 the satellite gateway carries. Alternatively, the Um logic of each satellite gateway can be configured to compute one Um and the central diversity controller 202 can be configured to compute per-channel Ums based on the per-satellite gateway Ums and channel-to-satellite gateway assignment information. The FIG. 2 population of GWRs 204 is an example and is not intended to limit practices according to this disclosure to systems with more than 6 GWRs 204. For example, "Q" can be integer 5, and in such a case GWR 204-6 may not be present.

The central diversity controller 202 can include a processor 208 coupled to a memory 210. The memory 210 can include instruction memory (not separately visible in FIG. 2) that can store executable instructions that, when read and executed by the processor 208, cause the processor to perform various functions described herein. The memory 210 can also include a data memory (not separately visible in FIG. 2), e.g., for storing operands and intermediate computation results of processes performed by the processor 208. The central diversity controller 202 can include an adaptive switching threshold logic 212 ("threshold" is abbreviated "THD" in FIG. 2) that can generate per GWR switching thresholds, referenced herein as THD(GWR-k), for input to a Um/THD based switching initiation logic 214. Operation of the Um/THD based switching initiation logic 214 can be based, at least in part, on comparing each GWR 204 Um with the GWR's THD from the adaptive switching threshold logic 212. If the GWR 204 Um exceeds its THD, traffic from that GWR may need to be switched to a backup GWR.

Adaptation of the THD(GWR-k) values can be based, for example, on a system requirement that can be continually evaluated. For example, switching frequency directly impacts availability of the GWR, i.e., higher switching frequency reduces availability and vice versa. Higher thresholds can reduce the switching frequency. If Um from a $k^{th}$ GWR 204-k is dependent only on rain fade, then an increase in THD(GWR-k) can provide higher availability. Since change in the system can be gradual, control loops associated with adapting such thresholds can be configured with a periodicity of, for example, a few days.

In an implementation, a maximum or target number of switches per day can be assigned to one or more of the GWRs 204. Assuming as an example a $k^{th}$ GWR 204-k, the adaptive switching threshold logic 212 can be configured to adjust THD(GWR-k), in a feedback manner, based at least partially on the number of switches per day. In an implementation, the adaptive switching threshold logic 212 can be configured to compute the number of switches happening per day for each GW, including the example GWR 204-k and, in response to the number of switches being higher than the maximum or target number, raise THD(GWR-k). This implementation will likely reduce the number of switching instances per day at the $k^{th}$ GWR 204-k. The adaptive switching threshold logic 212 can also be configured such that, in response to the number of switches per day at GWR 204-k being lower than the target number (or another threshold) the logic 212 can lower THD(GWR-k), which in turn can increase the switching instances per day. This technique can offset or counter seasonal variation in rain statistics that might result in the availability of the system being low in certain months. The target number of switches per day can be determined, for example, based at least partially on the availability requirement for GWR 204-k and the outage time per switching-in. For example, assuming a switching-in outage time of 10 seconds and the $k^{th}$ GWR 204-k having an availability requirement of 99%, the number of switches that can occur per day is integer 86. Each switching event carries two switching-in events, namely, switch from the primary GWR 204-k to the backup GWR 204, and switch back to the primary GWR 204-k.

The Um/THD based switching initiation logic 214 can be configured to generate and store a record, based on comparing Ums received from the GWRs 204 against their respective thresholds separately for each GW, that can list all the GWRs that have failed to meet the threshold. For description of example operations thereof the record will be referenced as "Gateway Switch Table" (not explicitly visible in the figures). It will be understood that "Table," in this context, does not define or limit the format or structure of the record to be within the meaning of "table," as that term is used in the pertinent arts. In example operations according to an aspect, the Um/THD based switching initiation logic 214 can include in the Gateway Switch Table all GWRs 204, regardless of whether or not currently carrying traffic. Example operations can include subsequent removal from the Gateway Switch Table of all GWRs 204 not currently carrying traffic.

The central diversity controller 202 can include a primary-backup pairing and priority logic 216. Depending on the backup architecture, though, the switching decision can be dependent on availability of backup GWRs 204 and, in a related manner, on the relative priority of GWRs 204, as described in greater detail later. The Um of the GWR 204 functioning as a backup, to which the traffic will be switched, also needs to meet a threshold criterion for the switch to occur. The threshold for the Um of the switch-to GWR 204 and the switching threshold of Um for the primary GWR 204 can be different. Implementations can provide adaptation and adjustment of these thresholds based, for example, on aging components and temporal conditions. The central diversity controller 202 can include a backup GWR setup logic 218 that can feed a switch primary traffic to backup resource logic 220 and satellite control facility (SCF) switch 222.

As described above, Um can be computed as a weighted sum of various performance metrics. The individual performance metrics contributing to Um can be defined such that increase in their magnitude corresponds to increase in unavailability of the gateway resource. For purposes of description, individual performance metrics forming Um can be normalized to the range of [0,1). In an implementation, the Um for an $i^{th}$ GWR 204 can be determined in accordance with the following Equation (1):

$$Um(GWRi) = f_i(PF(i,1), PF(i,2), \ldots PF(i,v), \ldots, PF(i,V)) \quad \text{Equation (1)}$$

where
$f_i$ is an $i^{th}$ function for an $i^{th}$ GWR 204, and
PF(i, v) is a $v^{th}$ of V individual performance metrics for the $i^{th}$ GWR 204.

In an implementation, all $f_i$ can be of the same form, e.g., a weighted sum, with a difference being GWR-specific weight values for different individual performance metrics. Such differences can accommodate, for example, a particular performance metric having an overall impact on a first GWR 204 that differs from its overall impact on a second GWR 204. The weighted sum can be in accordance with the following Equation (2)

$$Um(GWRi) = ((W(i,1)*PF(i,1)) + (W(i,2)*PF(i,2)) + \ldots + (W(i,)*PF(i,M))) \quad \text{Equation (2)}$$

, where
W(i,v) is the weight, relative to the $i^{th}$ GWR 204, of the $v^{th}$ individual performance metric.

One example plurality of individual performance metrics can include a fade metric, a number failures metric, a capacity metric, and a coverage metric, and Um for a given $i^{th}$ GWR 204 can be computed from these in accordance with, for example, Equation (3) below.

$$Um(GWRi) = fi(FadeMC(i), FailsMC(i), CapMC(i), CovMC(i)), \quad \text{Equation (3)}$$

where
FadeMC=fade metric,
FailsMC=failure metric,
CapMC=capacity metric, and
CovMC=coverage metric.

The individual performance metrics above are examples and are not intended as a limit on the scope of practices in accordance with this disclosure.

The form of the $f_i$ function of Equation (3) can be the Equation (2) weighted sum of the example performance metrics, such as the following Equation (4):

$$Um(GWRi) = W(i,Fade)*PF(i,FadeMC) + W(i,Fails)*PF(i,FailMC) + W(i,Cap)*PF(i,CapMC) + W(i, Cov)*PC(i, Cov MC), \quad \text{Equation (4)}$$

where
W(i, FadeMC)=weight of the fade metric for the $i^{th}$ GWR 204,
W(i, FailsMC)=weight of the failure metric for the $i^{th}$ GWR 204,
W(i, CapMC)=weight of the capacity metric for the $i^{th}$ GWR 204,
W(i, CovMC)=weight of the coverage metric for the $i^{th}$ GWR 204, and
W(i, Fade)+W(i, Fails)+W(i, Cap)+W(i, Cov)=1

Um can be chosen to represent only one of the individual performance metrics by setting to zero all of the weighting coefficients except for the selected one. For example, only FadeMC can be considered by applying a zero weight to each of FailsMC, CapMC, and CovMC.

Processes in Determining Individual Performance Metrics

In an implementation, the example capacity metric, CapMC, can be determined based on a ratio of the capacity being served currently by a GWR 204 to the maximum capacity that can be served by the GWR 204. As one specific example, CapMC can be determined according to the following Equation (5):

$$CapMC = 1 - \left(\frac{CapServe\ GWR}{MaxCapServe\ GWR}\right)_{Forward} + \\ 1 - \left(\frac{CapServe\ GWR}{MaxCapServe\ GWR}\right)_{Return},$$

Equation (5)

where

CapServe GWR=Capacity Being Served by GWR, and
MaxCapServe=Maximum Capacity that is Served by GWR.

Regarding the example fade metric, FadeMC, this can represent an attenuation of the uplink from the GWR 204 to satellite (e.g., FIG. 1 satellite 102, not visible in FIG. 2) experienced during rain. Rain at the GWR 204 site results in signal attenuation on both the forward uplink and reverse downlink, return for all the beams being served by the GWR 204. A satellite downlink beacon (not visible in FIG. 2) can also be used to estimate the fade on the actual transmit signal. More specifically, the fade metric FadeMC can be estimated from the change in the beacon signal-to-noise ratio (SNR), or in the received signal SNR at the GWR 204 from the SNR values in clear-sky conditions. The value of the beacon SNR can be determined from manually entry or by a long-term, e.g., multi-week, average of the beacon SNR. In an implementation, the FadeMC can be determined, for example, according to the following Equation (6):

$$FadeMC_{GW} = \frac{(\text{beacon } snr \text{ in clear sky} - \text{current beacon } snr)}{100}$$

Equation (6)

Regarding the coverage metric of an $i^{th}$ GWR 204, CovMC(i), this can be determined based on the amount of area or the number of users being covered by the GWR 204 at a certain time, compared to the total amount of area or number of users that can be served by the GWR. The coverage area of the system can be a useful representation, especially in a mobile network having terminals moving across beams, where any area not covered will impact such terminals' connectivity. A specific determination of the coverage metric, CovMC(i), can be according to the following Equation (7):

$$CocMC(i) = 1 - \frac{Coverage_{current}}{Coverage_{max}}$$

Equation (7)

If multiple carriers or beams are covering a certain area, the unavailability can be affected when all the carriers or beams are unavailable in that area. The total coverage area served by a GWR 204 is the difference of the sum of the areas covered by the beams and overlap between the beams. In an implementation, certain coverage areas can be weighted higher than others.

Where CovMC(i) is determined using the total number of users, each beam can have a count of the number of users that can be potentially served and the number of users that are being served by the GWR 204. In an implementation, weights can be assigned to each user such that certain users have a higher priority than others. This can assist in ensuring, or at least in providing an acceptable statistical likelihood, that higher priority users have better availability than lower priority users.

Regarding the failure metric, FailMC(i), of an $i^{th}$ GWR 204, this can be determined by the number of components that impact traffic that have failed, compared to the total number of components present. If the $i^{th}$ GWR 204 is a channel, "components" can mean components of the satellite gateway(s) that carry the channel. Since each component can have a different impact on the traffic, each can each a corresponding weight, and the final estimate of failure metric can be a weighted sum.

Failures at an $i^{th}$ GWR 204 can be either in hardware or software. In instances where a component in the GWR 204 cannot be replaced quickly enough, it may result in a loss in network performance or portions of the system might become unavailable. The number and impact of the failures may therefore determine the threshold to switch to the backup GW 204R, for example, in accordance with the following Equation (8):

$$FailMC_{GW} = 1 - \sum weight_i * \left(\frac{\text{number of failed comp}}{\text{number of comp}}\right)_i$$

Equation (8)

The central diversity controller 202 can include an adaptive switching threshold logic 212 that can generate a per GWR THD, which will be referenced as THD(GWR). In operations, each GWR 204 Um, which can be referenced as Um(GWR), can be compared to the THD(GWR) by the Um/THD based switching initiation logic 214. If Um(GWR) exceeds THD(GWR) the specific GWR 204 is likely unable to carry traffic according to its target performance, and therefore it is preferable to switch its traffic to a backup. For the switch to occur, the Um of the GWR 204 to which the traffic will be switched to also needs to meet a threshold criterion. These two thresholds can be different. Implementations can provide adaptation and adjustment of the thresholds based, for example, on aging components, temporal conditions.

For purposes of description, examples referencing FIG. 2 will arbitrarily assume that GWR's 204-1, 204-2, and 204-3 are designated primary GWRs, and that GWRs 204-5, and 204-6 are designated backup GWRs. This assignment is for purposes of example and is not intended as a limitation on practices according to this disclosure, or as a statement of preference as to a ratio of backup GWRs to primary GWRs. Specific examples will assume that each "gateway resource" 204 is an entire satellite GW. Persons of ordinary skill, though, upon reading this disclosure, can readily apply the described example to an alternative mode or configuration where each "gateway resource" can be one or more channels.

The central diversity controller 202 can store, in association with each of the plurality of backup GWRs 204, a plurality of primary to backup (P2B) pairing coefficients, one for each primary GWR 204 that can be switched to that backup GWR 204. Each P2B pairing coefficient can correspond to a particular primary gateway-particular backup gateway pair among all possible of such pairs. The pairing coefficient magnitude can be a measure of system impacts, e.g., performance costs, of switching from the pair's primary gateway to the pair's backup gateway. Stated differently, each P2B pairing coefficient can be indicative of a metric of switching according to the corresponding pairing. The stored pairing coefficients can be represented as a logic table, such as the following Table 1:

TABLE I

| Primary GWR 204-j | Backup GWR 204-i | P2B Pairing Coefficient PC (j, i) |
|---|---|---|
| 204-1 | 204-5 | PC (1, 5) |
| 204-1 | 204-6 | PC (1, 6) |
| 204-2 | 204-5 | PC (2, 5) |
| 204-2 | 204-6 | PC (2, 6) |
| 204-3 | 204-5 | PC (3, 5) |
| 204-3 | 204-6 | PC (3, 6) |

Assuming one arbitrary P2B pairing coefficient PC(j1, i1) to be a first P2B pairing coefficient, and another arbitrary P2B pairing coefficient PC(j1, i2) to be a second P2B pairing coefficient, the first P2B pairing coefficient and the second P2B pairing coefficient have a comparative relation indicative of a comparison of system performance impact of switching from the "j1" primary GWR to the "i1" backup GWR to that of switching from the "j1" primary GWR to the "i2" backup GWR.

The central diversity controller 202 can be configured to select switch-to backup gateway resources by applying to the plurality of pairing coefficients a process of selecting based, at least in part, on a lowest cost combination of pairings of backup gateway resources to primary gateway resources.

In an implementation, assuming the M:N architecture, the Um/THD based switching initiation logic 214, or the primary-backup pairing and priority logic 216 can be configured to create two distinct forms or versions of the above-described Gateway Switch Tables for GWRs 204 that have failed their respective Um thresholds—one for primary GWRs 204 and the other for backup GWRs 204. For purposes of description, the Gateway Switch Table for primary GWRs 204 that fail their respective Um thresholds will be referenced as "Primary Gateway Switch Table" and the Gateway Switch Table for backup GWRs 204 that fail their respective Um thresholds will be referenced as "Backup Gateway Switch Table." Another table of pairing coefficients, more specifically, backup to primary pairing coefficients, can be used to calculate when to switch back from the backup GWR 204 to the primary GWR 204 from which traffic was switched.

Priority Based Switching and Pairing

One process for selecting primary-backup pairings will be referenced, for purposes of description, as "priority based pairing." In priority based pairing, a priority coefficient, PR(k), can be applied to every $k^{th}$ GWR 204, both primary and backup, for ranking purposes. PR(k) can be normalized such that PR(k) ∈[0,1). The priority coefficient PR(k) can be dependent on various factors such as, but not limited to, the coverage of user beams served by the GWR 204, the capacity GWR 204 carries, and the beacon SNR. The priority coefficients PR(k) can be stored, for example, as a logic table, such as the following example Table 2.

TABLE 2

| Primary Gateway 204-j | Priority Coefficient PR (j) |
|---|---|
| 204-1 | PR (1) |
| 204-2 | PR (2) |
| 204-3 | PR (3) |

After applying the priority coefficients PR(k), a process of priority based pairing can begin selection by picking the primary GWR 204 with the highest priority coefficient, then finding, based on processes described in greater detail later, the backup GWR 204 with the highest pairing coefficient for that primary GWR 204.

Example priorities are presented in the following Table 3, and example pairing coefficients in Table 4.

TABLE 3

| Primary GWR | Priority Coefficient PR (j), |
|---|---|
| 204-1 | PR (1) = 0.95 |
| 204-2 | PR (2) = 0.65 |
| 204-3 | PR (3) = 0.37 |

TABLE 4

| Primary GWR 204-j | Backup GWR 204-i | P2B Pairing Coefficient PC (j, i) |
|---|---|---|
| 204-1 | 204-5 | PC (1, 5) = .75 |
| 204-1 | 204-6 | PC (1, 6) = .33 |
| 204-2 | 204-5 | PC (2, 5) = .85 |
| 204-2 | 204-6 | PC (2, 6) = .21 |
| 204-3 | 204-5 | PC (3, 5) = .9 |
| 204-3 | 204-6 | PC (3, 6) = .98 |

Using Table 3 and Table 4, an example process of priority based pairing will be described. The example assumes Um of all three example primary GWRs 204 exceeds their respective switching thresholds, i.e., Um(GWR 204-1) exceeds THD(GWR 204-1), Um(GWR 204-2) exceeds THD(GWR 204-2), and Um(GWR 204-3) exceeds THD (GWR 204-3).

The priority based pairing begins with selecting the one among GWRs 204-1, 204-2, and 204-3, having the highest priority coefficient, which is GWR 204-1. The process then finds the backup GWR 204 with which GWR 204-1 has the highest primary to backup (P2B) pairing coefficient. Referring to Table 4, this is backup GWR 204-5, as the 0.75 magnitude of PC (1,5) is higher than the 0.33 magnitude of PC (1,6). In this example, since there are only two backup GWRs 204, the pairing of primary GWR 201-1 to backup GWR 204-5 operates to pair primary GWR 201-2 to backup GWR 204-6. To handle instances where two or more primary GWRs 204 have the same priority coefficient, implementations can be configured to provide random assignment of order. In the example priority based pairing described above in reference to Table 3 and Table 4, the pairing of primary GWR 201-1 to backup GWR 204-5 can be an example of a first P2B pairing, the pairing of primary GWR 201-2 to backup GWR 204-5 an example of second P2B pairing; PC(1,5) can be an example of a first P2B pairing coefficient, corresponding to the example first P2B pairing, and PC(2,5) can be an example of a second P2B pairing coefficient, corresponding to the example second P2B pairing. Also, the pairing of primary GWR 201-1 to backup GWR 204-6 can be an example of a third P2B pairing and the pairing of primary GWR 201-2 to backup GWR 204-6 can be an example of fourth P2B pairing; PC(1,6) can be an example of a third P2B pairing coefficient, corresponding to the example third P2B pairing, and PC(2,6) can be an example of a fourth P2B pairing coefficient, corresponding to the example fourth P2B pairing.

A variation of the above-described example of priority based pairing will assume the same three primary GWRs, namely 204-1, 204-2, and 204-3, and their Table 3 priority coefficients, but will assume that GWR 204-4 as a third backup GWR 204. The table of P2B pairing coefficients will therefore include three additional P2B pairing coefficients, namely PC(1,4), PC(2,4) and PC(3,4). Arbitrary assumed values for each of these are set forth in the following example Table 5 of P2B pairing coefficients:

TABLE 5

| Primary GWR 204-j | Backup GWR 204-i | P2B Pairing Coefficient PC (j, i) |
|---|---|---|
| 204-1 | 204-4 | PC (1, 4) = .85 |
| 204-1 | 204-5 | PC (1, 5) = .75 |
| 204-1 | 204-6 | PC (1, 6) = .33 |
| 204-2 | 204-4 | PC (2, 4) = .52 |
| 204-2 | 204-5 | PC (2, 5) = .85 |
| 204-2 | 204-6 | PC (2, 6) = .21 |
| 204-3 | 204-4 | PC (3, 4) = .47 |
| 204-3 | 204-5 | PC (3, 5) = .9 |
| 204-3 | 204-6 | PC (3, 6) = .98 |

The pairing begins with selecting the one among primary GWRs 204-1, 204-2, and 204-3, having the highest priority coefficient, which is GWR 204-1. The process then finds the backup GWR 204, from among backup GWRs 204-4, 204-5, and 204-6, with which primary GWR 204-1 has the highest P2B pairing coefficient. Referring to the Table 5 example, this is backup GWR 204-4, because the 0.85 magnitude of PC (1,4) is higher than both PC (1,5) and PC (1,6). After pairing GWR 204-1 to backup GWR 204-6, the process can select the one among the remaining primary GWRs 204-2 and 204-3 having the highest priority coefficient, which is GWR 204-2. The process can then determine, from among the remaining backup GWRs 204-5 and 204-6, the backup GWR 204 with which GWR 204-2 has the highest P2B pairing coefficient. In this example, backup GWR is GWR 204-5. Primary GWR 204-2 is therefore paired with backup GWR 204-5. In this example, assuming since only one primary GWR, 204-3, and one backup GWR, GWR 204-6, remain, the pairing of primary GWR 204-2 to backup GWR 204-5 by default pairs primary GWR 204-3 to backup GWR 204-6.

Pairing Coefficient Based Pairing Selection.

As described above, the pairing coefficient is a measure of system factors, e.g., performance costs, of switching from the pair's primary gateway to the pair's backup gateway. Pairing coefficient based pairing selection can be performed by a process selecting the highest system benefit, e.g., lowest performance cost, combination of pairings of backup gateways to primary gateways.

One example implementation of a pairing coefficient based selection can be according to the following Equation (9):

$$C = \max_R \left( \sum_{i=1}^{(nBk)} \rho_{s_r,i,i} \right), \quad \text{Equation (9)}$$

where
nBk is the number of backup GWRs,
$PC_{i,j}$ is the P2B pairing coefficient from the $i^{th}$ primary GW to $j^{th}$ backup GWR,
Sr is the $r^{th}$ subset of SnPr, the set of permutations of primary GWRs,
, where
nPr is the number of primary GWRs that need to be switched, and
R is the number or permutations.

If the number of primary GWRs 204 that need switching, nPr, is less than the number of backup GWRs 204 available, nBk, SnPr will be repeated nBk times. It will be understood that Sr is the subset of primary GWRs 204, in order, that are to be switched to backup GWRs 204, in order.

An example pairing coefficient based pairing process will be described using the above-introduced assumption of GWR's 204-1, 204-2, and 204-3 being designated primary GWRs and GWRs 204-5 and 204-6 designated as backup GWRs. Applying Equation (9) to the example shows there are integer 6 permutations of pairings, which are:

primary GWR 204-1 to backup GWR 204-5, primary GWR 204-2 to backup GWR 204-6;

primary GWR 204-1 to backup GWR 204-5, primary GWR 204-3 to backup GWR 204-6;

primary GWR 204-2 to backup GWR 204-5, primary GWR 204-1 to backup GWR 204-6;

primary GWR 204-2 to backup GWR 204-5, primary GWR 204-3 to backup GWR 204-6;

primary GWR 204-3 to backup GWR 204-5, primary GWR 204-1 to backup GWR 204-6; and primary GWR 204-3 to backup GWR 204-5, primary GWR 204-2 to backup GWR 204-6.

The first pairing picks the maximum among the 6 pairings, as shown in Equation (10).

$c=\max\{(PC(5,1)+PC(6,2)),(PC(5,1)+PC(6,3))+(PC(5,2)+PC(6,1),(PC(5,2)+PC(6,3)),(PC(5,3)+PC(6,1))+(PC(5,3)+PC(6,2)\}$  Equation (10)

Using the P2B pairing coefficient values from Table 4 in Equation (10), produces the following Equation (11), $c=\max\{(0.75+0.21),(0.75+0.98),(0.85+0.33),(0.85+0.98),(0.9+0.33),(0.9+0.21)\}$  Equation (11)

$=1.83$; r=4, $s_r=(2,3)$

Based on the result of Equation (11), in this example, the result of applying pairing coefficient based pairing selection is that primary GWR 204-2 will pair with and switch to backup GWR 204-5, and primary GWR 204-3 will pair with and switch to backup GWR 204-6.

The above described pairing coefficient based pairing selection can be applied to the Table 5 example, which assumes backup GWR 204-4 as a third backup GWR 204, by applying operations in accordance with Equation (9), followed by selection in accordance with Equations (11) and (12), which pairs primary GWR 204-1 to backup GWR 204-4, primary GWR 204-2 to backup GWR 204-5, and primary GWR 204-3 to backup GWR 204-6.

Combination Priority/Pairing Based Pairing Selection

In this implementation, both the priority of the primary GWRs 204 to be switched and the pairing coefficients are taken together, and their combination maximized.

$$C = \max_R \left( \sum_{i=1}^{(nBk)} PR_{s_{r_i}} PC_{s_{r,i},i} \right) \quad \text{Equation (12)}$$

nPr is the number of primary gateways that need to be switched,

PCj,i is the pairing coefficient from primary GWR 204-*j* to backup GWR 204-*i*, PRj is the priority coefficient of primary GWR 204-*j*, Sr is the rth subset of SnPr, the set of permutations of primary GWRs 204, R is the number of permutations, and if nPr is <nBk SnPr will be repeated nBk times.

Applying Equation (12) to the example above described in reference to Table 3 and Table 4, i.e., three primary GWRs, 204-1, 204-2, and 204-3, and two backup GWRs, 204-5 and 204-6, the result for determining the first pairing can be according to the following Equation (13)

$$c = \max\{(PR_1PC_{5,1}+PR_2PC_{6,2}),(PR_1PC_{5,1}+PR_3PC_{6,3}),$$
$$(PR_2PC_{5,1}+PR_1PC_{6,1}),(PR_2PC_{5,2}+PR_3PC_{6,3})$$
$$(PR_3PC_{5,3}+PR_1PC_{6,1}),(PR_3PC_{5,3}+PR_2PC_{6,2})\} \quad \text{Equation (13)}$$

From Table 3 and Table 4 the selection result can be defined by Equation (14) below:

$$c = \max\{(0.95*0.75+0.65*0.21),(0.95*0.75+$$
$$0.37*0.98),(0.85*0.65+0.33*0.95),(0.65*0.85+$$
$$0.37*0.98)(0.37*0.9+0.95*0.33),(0.37*0.9+$$
$$0.65*0.21)\} \quad \text{(Equation 14)}$$

Using the values given c=1.0751, which results in primary GWR 204-1 pairing to and switching to backup GWR 204-5 and primary GWR 204-3 switching to backup GWR 204-6.

Computing Priority Coefficients

Functionality of the priority coefficients can include determining which primary GWRs 204 will switch if two or more GWRs 204 simultaneously experience an unavailability, i.e., Um, higher than their respective threshold. In one implementation, determining the priority of the GWRs 204 can be based at least partially on their respective amount of utilization. In an implementation, if a GWR 204 bandwidth is not being utilized due, for example, to the beams being served having few users or the coverage area experiencing night when utilization is low, that GWR 204 can be given a lower priority than another GWR 204 that has higher utilization. In various applications, priority coefficients can be based on determining or estimating utilization only on the forward path. In other applications, priority coefficients can be based on determining or estimating utilization on both the forward and return path.

Computing P2B (Primary GWR 204 to Backup GWR 204)Pairing Coefficients:

When a backup GWR 204 takes over traffic from a primary GWR 204, there can be a difference in system performance, which can be caused, for example, by satellite and network configurations. The P2B pairing coefficients can take these differences into account. In addition, certain combinations of primary and backup GWRs 204 are not possible. The P2B pairing coefficients can also take this into account, for example, by setting the P2B pairing coefficients of impossible pairings to zero. In an implementation both the system effects and possibility of pairings can be taken into account. In addition, Um for each of the GWRs 204 can also be considered. One such configuration can be according to the following Equation (15)

$$PC_{p_ib_j} = (Um_{p_i})*(1-Um_{b_j})*\frac{perf_{b_j}}{perf_{p_i}}*(\text{blocked})*busy_{b_j} \quad \text{Equation (15)}$$

where $b_j$ is the $j^{th}$ backup GWR 204, $P_i$ is the $i^{th}$ primary GWR 204, per fk is the performance of GWRk, PCpibj is the pairing coefficient from the ith primary GWR 204 to $j^{th}$ backup GWR 204, busybj is a Boolean value, which can be equal 0 when the $j^{th}$ backup GWR is carrying traffic, otherwise equal to 1, "blocked" is a Boolean value, which can be equal to 0 when the combination of $p_i$ and $b_j$ cannot occur, otherwise equal to 1.

Blocking scenarios can be handled by setting the pairing coefficient to logic zero. For purposes of description, such setting can be denoted by the variable, Blocked, which is a Boolean value, being 0 (when blocked) and 1 (when not blocked). This can depend on the current configuration, as in which backup GWRs 204 are serving which primary GWRs 204. This can ensure that the performance loss and the Um are both taken in to account when moving to backup GWR 204, j from primary GW, i.

Computing Backup to Primary (B2P) Pairing Coefficients.

The backup to primary (B2P) pairing coefficients are calculated in a M:N architecture. In this architecture, the backup does not carry any traffic of its own. The B2P pairing coefficients can be set to zero unless the backup is serving another primary. Then the B2P pairing coefficient can be changed for the primary GWR 204 that the backup GWR 204 is serving, and every other B2P coefficient set to zero. Like the P2B pairing coefficient computation, the B2P pairing coefficients can be computed using the following Equation (16).

$$\rho_{b_jp_i} = (Um_{b_j})*(1-Um_{p_i})*$$
$$\frac{perf_{p_i}}{perf_{b_j}}*(p_i = primaryGW \text{ being served?}) \quad \text{Equation (16)}$$

where bj is the $j^{th}$ backup GWR 204, pi is the $i^{th}$ primary GWR 204, perfk is the performance of the GWR k, and PCbjpi is the B2P pairing coefficient from ith backup GWR to jth primary GWR.

Figure 3:
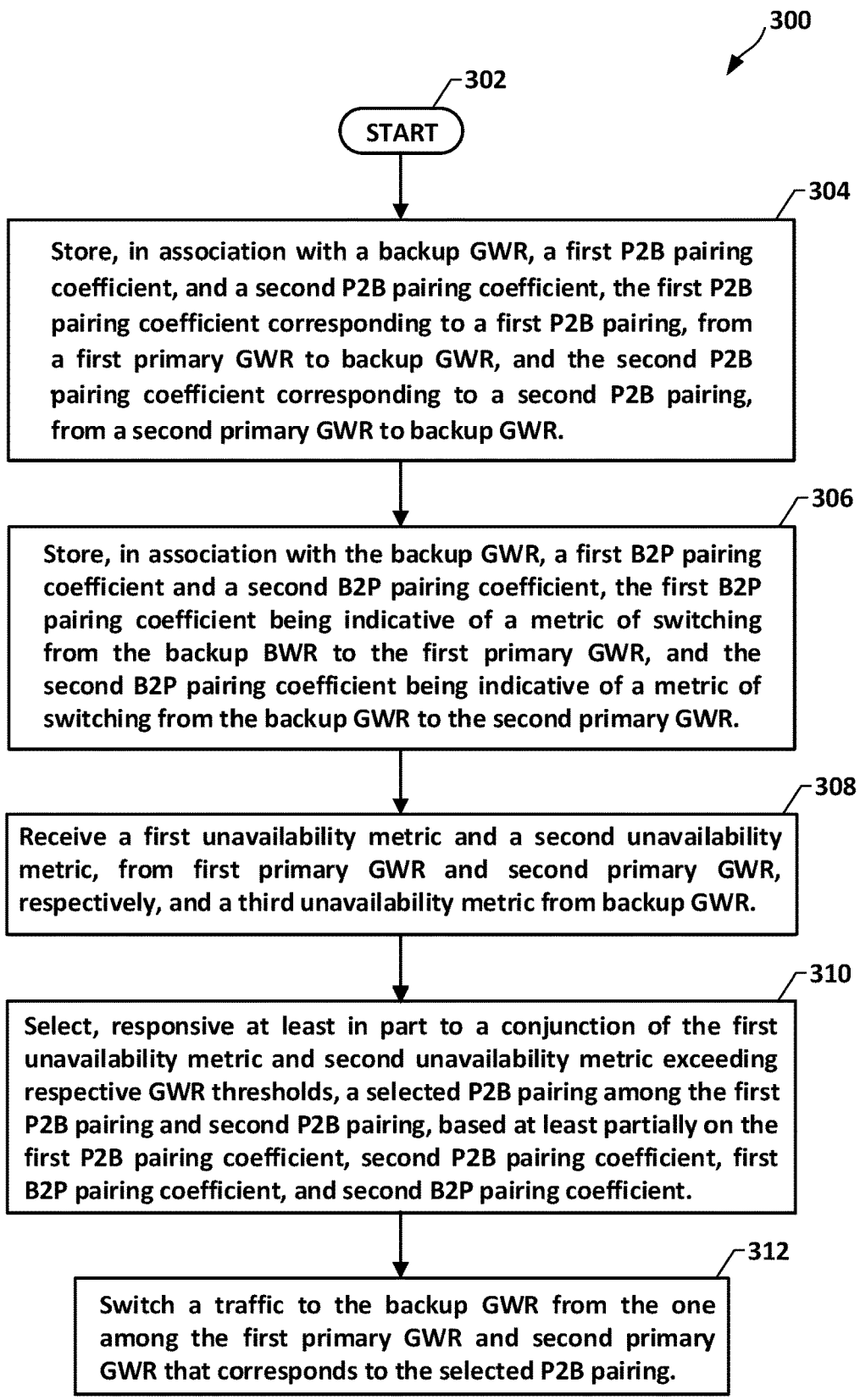
FIG. 3 is logic flow diagram of operations in one process in a method for unavailability based, generic gateway switching according to the present disclosure.

FIG. 3 is a logic flow diagram of operations in a flow 700 in one process of a method for unavailability based, generic gateway switching according to the present disclosure. For convenience, examples of various operations in the flow 300 will be described in reference to FIG. 2. Operations in an example instance of flow 300 will be described assuming an M:N architecture with GWRs 204 being pre-assigned primary GWRs 204. Specific examples will assume that each "gateway resource" is an entire GWR, for example, any of the GWRs 204. Persons of ordinary skill, though, upon reading this disclosure, can readily apply the described example to an alternative mode or configuration where each "gateway resource" is a channel carried by one of the GWRs 204 or a virtual channel that can be dynamically distributed to any one GWR 204, or over a plurality of GWRs 204. In an M:N architecture each of such channels can be a primary channel or can be a backup channel. For purposes of description, examples referencing FIG. 2 will arbitrary will assume that GWR's 204-1, 204-2, and 204-3 are designated primary GWRs, and GWRs 204-5, and 204-6 are designated backup GWRs. This assignment is for purposes of example and is not intended as a limitation on practices according to this disclosure, or as a statement of preference regarding ratio of backup GWRs to primary GWRs. Example operations will also assume Table 4 above as arbitrary pairing coefficient values.

Logic blocks of the FIG. 3 diagram of flow 300 will be described in the numeric order of their item numbers, which also corresponds to the top-down order of their positions on the viewing plane of the figure. It will be understood, though, that operations corresponding to the FIG. 3 logic blocks are not necessarily performed in such order. It will also be understood that operations corresponding to the FIG. 3 logic blocks can be performed according to mutually different schedules, or periodicities, and that such operations are not necessarily mutually synchronous. For example, operations for storage of pairing coefficients, described in reference to logic block 304, can include instantiation or initialization of such coefficients, and can include subsequent updates. The updates can be performed, for example, in response to active polling of the GWRs 204 by the central diversity controller 202. Alternatively, or in addition, updates can be performed by the central diversity controller 202, for example, in response to receiving non-polled information from the GWRs 204, such as a backup GWR 204 becoming unavailable. Also, operations such as storage operations at 304 associated with updating pairing coefficients can be performed at a substantially higher frequency than, for example, operations in response to GWR 204 Ums exceeding their respective thresholds.

Operations according to the flow 300 include examples described being performed by the FIG. 2 Um/THD based switching initiation logic 214 and primary-backup pairing and priority logic 216. Either or both of logic 214 and 216 Um/THD based switching initiation logic 214 can be implemented, entirely or in part, by executable instructions stored in the memory 210 that, when executed by the processor 208, cause the processor to perform the described logic functions.

Referring to FIG. 3, an instance of the flow 300 can begin at an arbitrary start state 302 and proceed to 304, where operations can store, in association with a backup GWR, a first P2B pairing coefficient and a second P2B pairing coefficient, the first P2B pairing coefficient corresponding to a first P2B pairing, from a first primary GWR, e.g., FIG. 2 GWR 204-1 to the backup GWR, e.g., GWR 204-4, and the second P2B pairing coefficient corresponding to a second P2B pairing, from a second primary GWR, e.g., GWR 204-2 to the backup GWR. Examples of a first P2B pairing coefficient and a second P2B pairing coefficient can be the Table 4 P2B pairing coefficients PC(1,4) and PC(2,4). Operations at 306 can include store, in association with the backup GWR, a first B2P (backup to primary to backup) pairing coefficient and a second B2P pairing coefficient. The first B2P pairing coefficient can be indicative of a metric of switching from the backup GWR, e.g., FIG. 2 GWR 204-4, to the first primary GWR e.g., FIG. 2 GWR 204-1. The second B2P pairing coefficient can be indicative of a metric of switching from the backup GWR to the second primary GWR, e.g., FIG. 2 GWR 204-2. It will be understood that operations at 304 and 306 can include continual updating, concurrent with or overlapping with operations in other blocks such as 308, 310, and 312.

Operations in the flow 300 can include, at 308, receiving a first unavailability metric and a second unavailability metric, from the first primary GWR and the second primary GWR, respectively, and a third unavailability metric from the backup GWR. Examples of such operations can include receiving Um(GWR 204-1), Um(GWR 204-2), and Um(GWR 204-4). Operations in the flow 300 can include, at 310, selecting in responsive at least in part to a conjunction of the first unavailability metric and the second unavailability metric exceeding respective GWR thresholds, a selected P2B pairing among the first P2B pairing and the second P2B pairing. The selection can be based at least partially on the first P2B pairing coefficient, the second P2B pairing coefficient, the first B2P pairing coefficient, and the second B2P pairing coefficient. For example, referring to Table 4 and assuming a pairing coefficient based pairing selection, or a mixed priority-pairing coefficient based selection, operations at 310 can be based at least in part on PC(1,4) and PC(2,4) and (not explicitly visible in Table 4) a B2P pairing coefficient for switch back from backup GWR 204-4 to primary GWR 204-1 and a B2P pairing coefficient for switch back from backup GWR 204-4 to primary GWR 204-2. Operations in the flow 300 can include, at 312, switching a traffic to the backup GWR 204 from the one among the first primary GWR 204 and second primary GWR 204 that corresponds to the selected P2B pairing. Operations at 312 in switching the traffic to the backup GWR 204 in accordance with the selected pairing can be performed, for example, by backup GWR setup logic 218, by the switch primary traffic to backup resource logic 220 and, if required, by a switch functionality of the SCF switch 222. It will be understood that backup resource logic 220 and SCF switch 222 can be external to the central diversity controller 202.

In an implementation, the primary-backup pairing and priority logic 216 can be configured to apply what can be termed a "priority based" pairing selection. This configuration can include, for example, executable instructions stored in the memory 210, or dedicated logic resources (not separately visible in the figures), or both. Operations according to this configuration can include assigning a first priority coefficient to the first primary gateway resource, e.g., GWR 204-1, and a second priority coefficient to the second primary gateway resource, e.g., GWR 204-2, then selecting the selected pairing based at least partially on relative magnitude of the first priority coefficient and the second priority coefficient. For purposes of example, it will be assumed that both Um(GWR 204-1) and Um(GWR 204-2) exceed their respective switching threshold, and that the arbitrary priority coefficient values from Table 3 are applied. Therefore, the first priority coefficient is 0.95, and the second priority coefficient is 0.65. Priority based pairing selection as to which among primary GWR 204-1 and primary GWR 204-2 will be switched is according to which has highest priority coefficient, which for this example is GWR 204-1. Since GWR 204-5 is the only backup GWR, this priority selection effectively selects the primary-backup pairing of GWR 204-1 and GWR 204-5.

Another example priority based pairing selection will be described using, as an assumed scenario, the above-described example of the first and second primary GWRs 204-1 and 204-2 but adding GWR 204-6 as a second backup GWR. For purposes of description, the backup GWR 204-5 can be referred to as a "first backup GWR 204-5," the P2B pairing coefficients associated with GWR 204-5 can be referred to as "first plurality of backup gateway resource pairing coefficients," and GWR 204-6 can be referred to as "second backup GWR 204-6."

Operations can include, for example as additional operations at 304, storing in association with the second backup GWR 204-6 a second plurality of backup gateway resource pairing coefficients. The second plurality of backup gateway resource pairing coefficients can include a second backup gateway resource first pairing coefficient and a second backup gateway resource second pairing coefficient. The second backup gateway resource first pairing coefficient can correspond to system effect of a first pairing of the second backup gateway resource, e.g., GWR 204-6, which can be to the first primary GWR 204-1. The second backup gateway resource second pairing coefficient can correspond to system effect of a second pairing of the second backup gateway resource (in this example, second GWR 204-6), which can be to the second primary GWR 204-2. The selection of which among first backup GWR 204-5 and second backup GWR 204-6 is paired to the first primary GWR 204-1 and which is paired to the second primary GWR 204-2 can include first selecting the primary GWR 204 having the highest priority and then pairing that primary GWR 204 to the backup GWR 204 with which the primary has the highest pairing coefficient. Referring to the example values in Table 3, first primary GWR 204-1 has the highest priority. Referring to Table 4, the backup GWR 204, from among first backup GWR 204-5 and second backup GWR 204-6 with which first primary GWR 204-1 has the highest pairing coefficient is first backup GWR 204-5. Operations in the priority based pairing selection will then select, based at least partially on the selected backup gateway resource for the first primary gateway resource, a selected backup gateway resource for the second primary gateway resource. In this example, the only remaining backup GWR is second backup GWR 204-6 and the only remaining primary GWR is first primary GWR 204-2, so the pairing of the two is effectively established by the first pairing.

Um Noise Filter

The examples described in reference to FIG. 2 show the central diversity controller 202 performing switching decisions directly based on Ums from the GWRs 204. There can be noise, however, in the measurements of one or more of the variables on which is Um based. This can cause fluctuations in the computed Um. Such fluctuations can be reduced by applying a smoothing filter process to the Ums computed by the Um logic 206 of each GWR 204. In one implementation of such filtering, the Um logic 206 of one or more of GWRs 204 can be configured with a local Um filter logic (not visible in FIG. 2). In another implementation, a modification of the central diversity controller 202 can include with a smoothing filter logic (not visible in FIG. 2), as described in greater detail later.

Um Prediction

Switching traffic from a primary GWR 204 to a backup GWR 204 can require substantial time. To avoid associated delay, the switching decision can include predicting, for each GWR 204, a future Um and comparing the predicted Um to the particular threshold for that GWR 204. This can enable a pre-switching set up of the backup GWR 204, and the satellite (e.g., FIG. 1 satellite 102), before further loss in performance occurs. In an implementation, the prediction horizon can preferably be a time in the future equivalent to a total setup time (satellite and network) for the switching. In instances where such prediction cannot be done, the system may operate with lower performance during the setup time, because the setup of the backup GWR 204 will take place after the Um of the primary GWR 204 has crossed the threshold. In one implementation, respective Um logic 206 of one or more of the GWRs 204 can be configured with a local Um prediction logic. In another implementation, modification of the central diversity controller 202 can include such prediction logic, as described in greater detail later.

Figure 4:
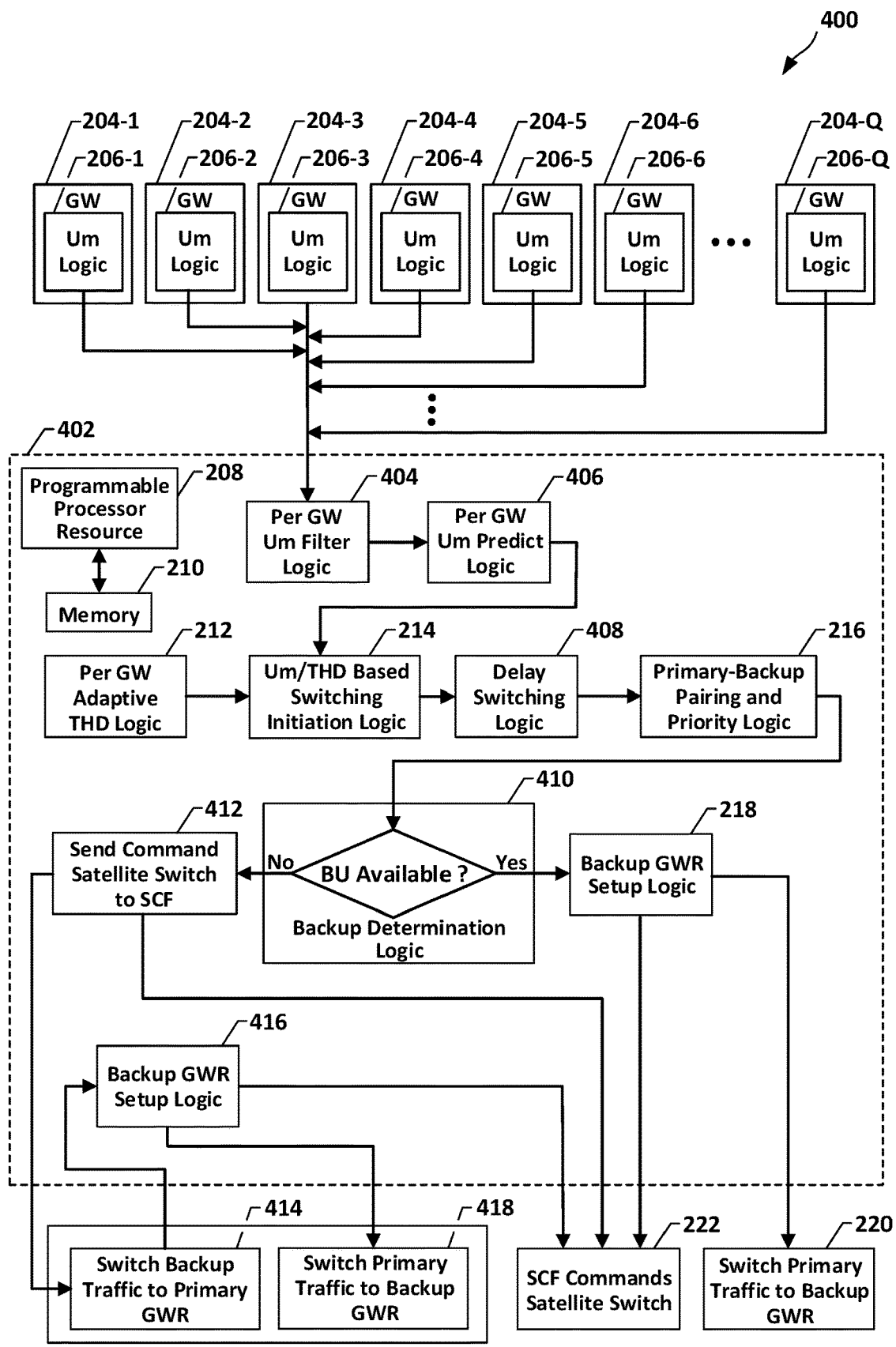
FIG. 4 is a functional block diagram of one example modification of the FIG. 2 system for unavailability based, generic gateway switching according to the present disclosure.

FIG. 4 is a functional block diagram of an implementation of another UMB generic gateway switching system 400 (hereinafter "the system 400") according to the present disclosure. The system 400 can include a central diversity controller 402 that can connect to the GWRs 204 and can include logic providing all Um-based switching functionality described above for the FIG. 2 central diversity controller 202. More specifically, the central diversity controller 402 can include the programmable processor resource 208 or a functionally equivalent a programmable processor device coupled to the memory 210, or an equivalent thereto. The central diversity controller 402 can also include the adaptative switching threshold logic 212, which is per-GWR, and the Um/THD based switching initiation logic 214, or functional equivalents. In an implementation, the central diversity controller 402 can also include a per-GWR smoothing logic such as Um smoothing filter logic 404 configured to apply a smoothing filter process to the Ums received from the Um logic 206 of GWRs 204, as described above.

Regarding implementation of the per-GWR Um smoothing filter logic 404, one example can be an exponential moving average filter, such as described by the following Equation (17)

$$y(t)=h(t)*x(t); \text{ where "*" denotes convolution} \quad \text{Equation (17)}$$

, where h(t) is the smoothing filter impulse response, x(t) is the time series of Um, y(t) is the filtered output.

Using an exponential moving average filter the above Equation (17) can be written as the following Equation (18):

$$UmFLT(n)=\alpha Um(n)+(1-\alpha)UmFLT(n-1) \quad \text{Equation (18)}$$

, where

UmFLT(n) is the filtered unavailability metric at time instant n,

Um(n) is the unavailability metric at time instant n, and

α is the smoothing constant and can be between 0 and 1.

The central diversity controller 402 can include a per-GWR prediction logic such as prediction logic 406 that can be configured to receive the noise-filtered Um values from the per-GWR Um smoothing filter logic 404 and, base at least partially on a per-GWR history of such noise-filtered Um values, to generate predicted future Um values. In an implementation, the prediction logic 406 can be configured with, or with functionality to construct a prediction model (not separately visible in FIG. 4) for each of the GWRs 204. Contemplated implementations of the prediction logic 406 can include machine learning prediction functionality. The prediction logic 406 can be configured with or configured to construct prediction models with an estimation time horizon that, preferably, can be equal to the time interval required for setting up a backup gateway resource.

Referring to FIG. 4, the Um/THD based switching initiation logic 214 can be the same as described in reference to FIG. 2.

In an aspect, the central diversity controller 402 can include a delay switching logic 408, for example, between the Um/THD based switching initiation logic 214 and the primary-backup pairing and priority logic 216.

Functionality of the delay switching logic 408, in overview, can include detecting whether Um(GWR) (e.g., fade) meets the GWR's threshold and whether Um(GWR) exceeds a max cap (Max_th), and providing a first timer that detects an accumulated time of Um(GWR) being above GWR's threshold, and a second timer that detects intervals of Um(GWR) being continuously below the threshold. The delay switching logic 408 can switch a GWR to its paired backup GWR in response to the first timer's accumulated time reaching a first time threshold, T1_th, or Um(GWR) exceeding Max_th, without the second timer detecting Um(GWR) falling below the GWR's threshold for a continuous interval exceeding a second time threshold, T2_Th. The process switches the GWR when the accumulated time reaches T1_th. If the second timer detects Um(GWR) falling below the GWR's threshold for a continuous interval exceeding T2_th prior to the first timer's accumulated time reaching T1_th or Um(GWR) exceeding Max_th, the first and second timers are reset.

Certain technical benefits of the delay switching logic 408 will be described. These can relate in part to the number and duration of rain events where a certain fade depth is exceeded being estimated International Telecommunications Union (ITU) recommended models. The number of rain events where a certain fade attenuation is exceeded can fall exponentially with the duration of the event. If the number of rain events exceeds the number of switches that can be supported then, preferably, the switching time and/or number of switching events are minimized. One implementation for reducing the number of switching events is to react only to events that have a minimum or qualifying duration. Specific waits for a certain period after the fade threshold is reached to ensure that the rain event is of a sufficient duration. This period will be configurable based on the system, the GWR locations, system availability requirements etc. To help avoid the capacity decreasing drastically during this time, a minimum attenuation or maximum fade (Max_Th) can be used. If this threshold is reached, the system can switch to the backup GWR without any further wait. Also, to allow for small fluctuations in the fade that drops Um below the threshold, a second timer (Timer2) can be used. If the fade drops below the threshold for a time that is less than Timer2's period, the wait in Timer1 is not reset.

As described in greater detail later, implementations include a "switch and stay" technique in which traffic is not switched back from a backup GWR to its primary GWR until occurrence of certain events. As also described, implementations can operate with an "N active" architecture in which GWRs are not pre-designated as "primary" and "backup." In such implementations, when an active gateway's Um reaches its switching threshold, there may be no GWRs to perform as its backup GWR. Example operations can include detection of a switched-out GWR being available again, and accordingly switching traffic back to that GWR from the GWR that was assigned to being its backup. Referring to FIG. 4, the system 400 can provide such operations with a features such as a backup determination logic 410. In an example implementation, in response to an active gateway's Um reaching its switching threshold, the backup determination logic 410 can first determine if there is an available backup GWR. If the answer is "yes," operation can be passed to the backup GWR setup logic 218 and backup resource logic 220 and the switch primary traffic to backup GWR as described above. To provide for the answer at 410 being "no," a logic 412 can be configured to initiate a switch back of traffic earlier switched to a given GWR in response to another GWR, which is now available again, having reaching its Um threshold. The logic 412 can be configured to send commands to the SCF switch 222 and to pass operation to a logic 414, configured to switch backup traffic to the its original GWR. The logic 414, in conjunction with switching traffic from a current backup GWR traffic back to the now available GWR that originally carried the traffic, can pass operation to logic 416, configured to set-up the GWR that is now available again as a backup GWR. The logic 416 can send backup configuration commands to logic 418, which can be configured to perform operations of switching traffic to the newly available backup GWR and can send commands to SCF switch 222.

Figure 5:
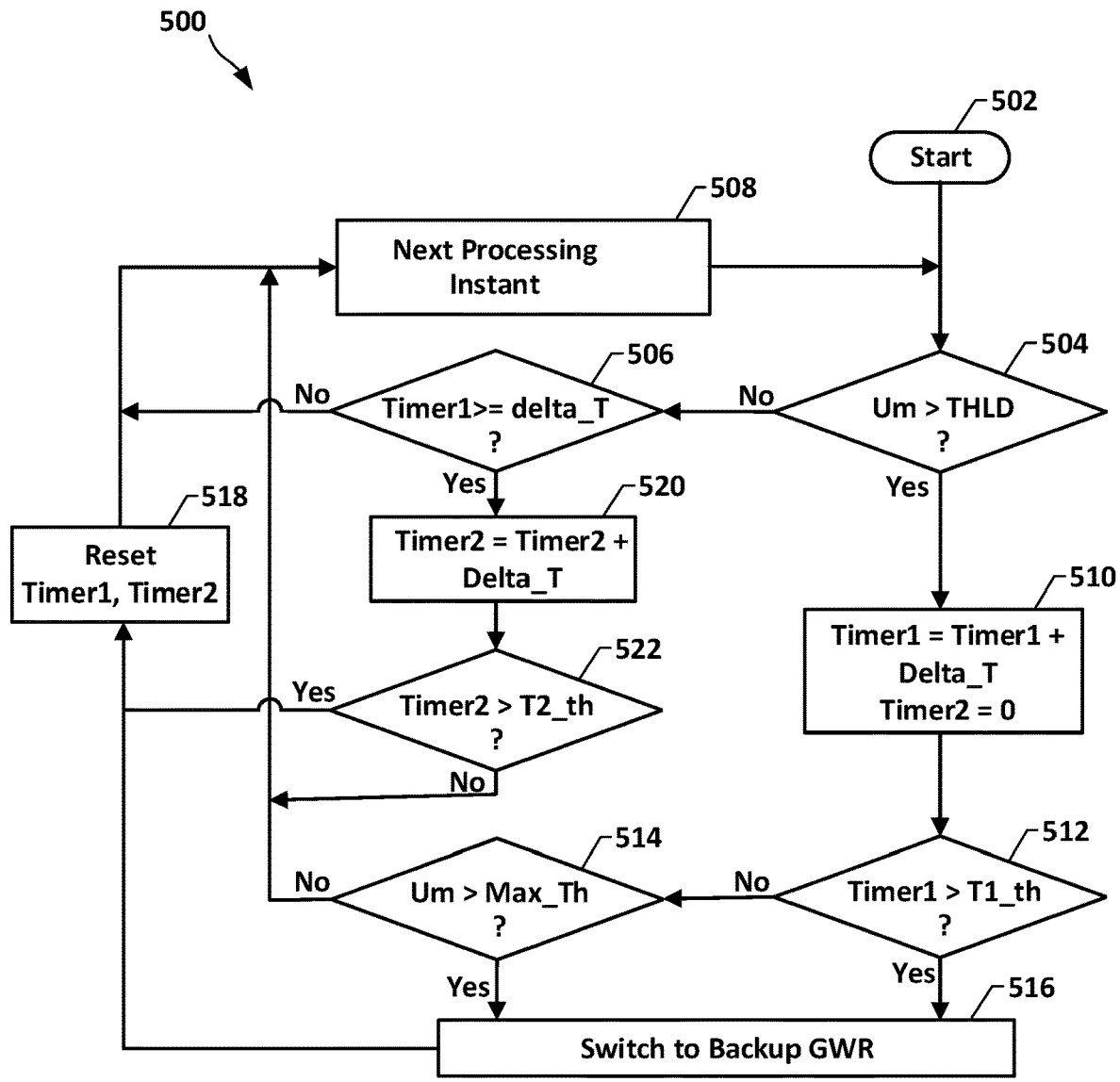
FIG. 5 is a logic flow diagram of example operations in a process of an implementation of the delayed switching block of the FIG. 4 system for an unavailability based, generic gateway switching system according to the present disclosure.

FIG. 5 is a logic flow diagram of operations in a flow 500 in one process of delayed switching, in an implementation of the FIG. 4 delay switching logic 408. For purposes of description assumed that prior to an arbitrary start at 502 a first timer, Timer1, has been reset to a starting, e.g., zero value. Operations according to the flow diagram 500 (hereinafter "the flow 500") can proceed from the start at 502 to 504, where a Um from a particular GWR, e.g., FIG. 4 GWR 204-1, can be compared to the gateway's threshold. The received Um can be direct, or can be an output from a smoothing filter, such as the FIG. 4 per-GWR Um smoothing filter logic 404. The received Um can be a present value, or a present filtered value, or can be a predicted Um for the particular gateway, e.g., a predicted Um output from the FIG. 4 prediction logic 406. It will be assumed for purposes of description that, at this iteration, the GWR 402-1 Um does not exceed the threshold. Therefore, the flow 500 can proceed from the "No" outbranch of 504 to 506. The flow path exiting from 506 depends on Timer1 relative to an increment value, Delta_T. In the present iteration, the Timer1 is still at its 0 reset value. Therefore, the flow 500 proceeds from the "No" outbranch of 506 to 508 and, at the next processing instant, e.g., next clock edge, can proceed to 504 and start a second iteration of the above-described loop, i.e., 504, 506, 508. The loop from 504 to 506 to 508 can continue until, at 504, Um is greater than the GWR 204-1 threshold.

In response to Um exceeding the GWR 204-1 threshold at 504, the flow 500 can proceed from 504 to 510, where Timer1 can be incremented by Delta_T, and Timer2 set to logic "0." From 510, the flow 500 can proceed to 512 where Timer1 can be compared to a first temporal threshold, T1_th. It will be assumed that T1_th is greater than Delta_T, which is the value of Timer1 at this iteration, due to the incrementing at 510. The flow 500 can therefore proceed from 512—conditional on not being overridden at 514 by a high fade—to 508 for another iteration. In this iteration, the flow 500 proceeds from 508 to 504 where it is again compared to the GWR 204-1 threshold. It will be assumed, for this iteration, that Um from GWR 204-1 maintains a value greater than the threshold, and does not exceed the cap, Max-Th, for the duration T1_Th applied at 512. The above-described loop of 508 to 504, to 510, to 512, to 514, and back to 508 therefore continues until, at 512, Timer1 is at T1_Th. The flow 500 can then proceed from the "Yes" outbranch of 512 to 516 where traffic from the subject GWR can be switched over to its paired backup GWR. From 516 the flow 500 can proceed to 518 where Timer1 and Timer2 can be reset, whereupon the flow 500 can, at the next processing instant 508, proceed to 504 and wait for the next instance of a GWR Um exceeding the GWR's assigned threshold.

In the above-described example, upon the initial instance at 504 of Um being greater than the GWR 204-1, the loop of 508 to 504, to 510, to 512, to 514, and back to 508 continued until, at 512, Timer1 was at T1_Th. The reason was that in none of such loops was Um detected, at 504, of having fallen lower than the threshold. For purposes of description, it will be assumed that at 504 Um was detected as having fallen below the threshold, for example, due to rain fade. The flow 500 would then proceed to 506. In this instance, since each preceding instance of the loop from 508 to 504, to 510, to 512, to 514, had at 510 incremented Timer1, the comparison at 506 would be "yes." Accordingly, the flow 500 can proceed from 506 to 520, where Timer2 can be incremented by Delta_T, and then to 522 where Timer2 can be compared to T2_th. For purposes of description, it will be assumed that Timer2 was at 0 before the above-described increment by Delta_T at 520, and that T2_th is significantly larger than Delta_T. The flow 500 will therefore, in this iteration, exit the "No" outbranch from 522 and return to 508 to await the next processing instant. It will also be assumed, for purposes of description, that the decrease in Um, e.g., the rain fade, has a duration such that the loop of 508 to 504, then 506, 520, 522 and 508 has repeated such that 520 has incremented Timer2 to exceed T2_th. The flow 500, in response to the first arrival at 522 whTimer2 is greater than T2_th, will proceed from the "Yes" outbranch of 522 to 518, where Timer1 and Timer2 can be reset to 0, and then to 508 to await the next processing instant.

Continuing with description of example instances of flow 500, it will be assumed that in some iteration of the above-described the loop of 508 to 504, 506, 520, 522 and back to 508, prior to 520 having incremented Timer2 to exceed T2_th, Um increases to exceed THLD. In response the flow 500 can proceed from 504 to 510, increment Timer1 and reset Timer2 to 0. Thereafter, the loop from 508 to 504, then to 506 to 520 to 522 and back to 508, or the loop from 508 to 504, then to 510, to 512, to 514, and back to 508, or both, will continue until whichever of the following happens first: Timer1 is incremented to reach T1_th, whereupon 512 will send the flow to 516, causing the GWR to be switched, Um exceeds Max_th, whereupon 514 will send the flow 500 to 516, causing GWR to be switched, or Timer2 exceeds T2_th, whereupon 522 will send the flow 500 to 518 which resets Timer1 and Timer2, and sends the flow 500 back to 508.

Switch Back Without Delay

In an aspect, after a switch-out primary GWR Um falls below its threshold, traffic that the primary GWR carried prior to the switch-out can be switched back to that primary GWR without delay. This aspect can be referred to as "switch back without delay." Example operations can include, for each backup GWR whose primary GWR has become available, switched back to that primary GWR. All backup GWRs carrying traffic can be added to the above described Backup Gateway Switch Table. Since the traffic from each backup can only be switched back to the primary GWR it is serving, only one B2P pairing coefficient per backup GWR will be non-zero. Until the primary GWR's Um is high, the one B2P pairing coefficient will be low enough that the backup GWR traffic will not switch back. Upon the B2P pairing coefficient being sufficiently high, the traffic can be moved back to the primary GWR.

In an implementation, decisions on the Backup Gateway Switch Table can be made first. After necessary backup GWRs have been switched back to their primary GWRs, thereby making backup GWRs available, decision on the primary GWRs in the Primary Gateway Switch Table can be made. In associated operations, the P2B pairing coefficients can be updated again—before applying the above-described pairing selection processes, e.g., the priority-based pairing process, the pairing coefficient-based pairing process, or the combination priority/pairing coefficient based pairing process.

It will be understood that the above-described Backup Gateway Switch Table can be created for the M:N architecture but is not necessarily created for the N active architecture. Instead, in implementations for N active GWR architectures, there may be only one table, which can be referred to as "Gateway Switch Table."

Switch and Stay

In another aspect, upon switch-out of a primary GWR, e.g., due to the primary GWR becoming unavailable due to rain fade, the traffic can be kept on the switch-in backup GWR until another primary GWR requires that backup GWR, or until the backup GWR fails its Um threshold, whichever occurs first. For purposes of description, diversity switching according to this aspect can be referenced as "switch and stay." In scenarios such as multiple successive events from the same primary GWR, the switch and stay aspect can, for example, avoid or reduce instances of successive back-and-forth switching. In a further aspect, switch and stay can be configured such that, after switch over from a given primary GWR to a given backup GWR, if the backup GWR fails its Um threshold while the given primary GWR is still unavailable, that backup GWR is preferably not switched out.

As described above, in an implementation described above, decisions can preferably be made on the Backup Gateway Switch Table first. However, in the switch and stay implementation, the backup GWRs are preferably not switched immediately. Instead they are marked as being available, available to switch, and unavailable. The P2B pairing coefficients can be updated to reflect the backup GWs status. Decisions can then made on the Primary Gateway Switch Table. The backup GWRs that are required from this process can then be switched to the primary GWRs they were originally serving. The primary GWs which have currently become unavailable can then be switched out to the newly available backup GWRs.

Switch and Stay for a Certain Duration

This method is like the switch and stay method but instead of keeping the traffic on the backup until the next primary GWR becomes unavailable, the backup GWR can carry traffic for a certain period before the traffic is moved back over. The duration over which the backup GWR carries the traffic can be pre-calculated.

In the above-described implementations referring to M primary gateways being served by N backup gateways (M:N), the M:N can, but does not necessarily apply to the entire satellite system. For example, an implementation include splitting an entire satellite network into multiple M:N sections, with different M and N in each section. Each of such sections can include various techniques and implementations therefore, described above, in each of such M:N section's detection of Um and switching decisions, including adaptable per GWR thresholds, and primary to backup pairing, both forward and reverse.

Figure 6:
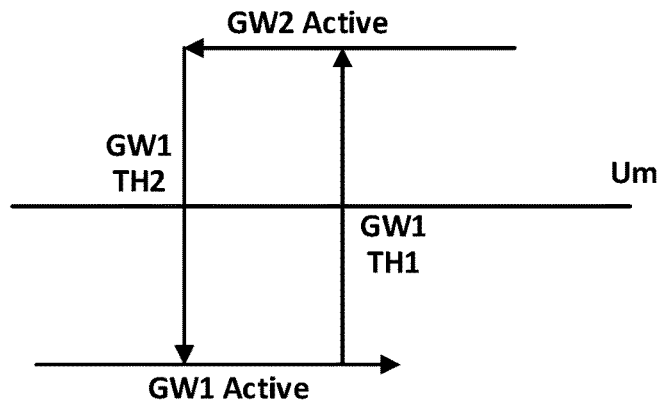
FIG. 6 is a diagram of one example hysteresis configuration for switching thresholds in a generic gateway switching system according to the present disclosure.

FIG. 6 is a diagram of one example hysteresis configuration 600 for switching thresholds in a generic gateway switching system according to the present disclosure. Referring to FIG. 6, it will be assumed that GW1 is a first gateway resource, e.g., FIG. 2 first primary GWR 204-1, and GW2 is a second gateway resource, e.g., first backup GWR 204-5. It will be understood that GW1 is not necessarily, a first primary GWR, and GW2 is not necessarily a first backup GWR. It will be assumed that GW1 is active, and GW2 is not active. When Um of the active GW1 reaches a forward switch threshold (hereinafter "GW1 TH1"), the system switches GW1 traffic to GW2, whereupon GW1 become inactive, and GW2 active. While GW2 is active, the Um of GW1 falling below GW1 TH1 does not initiate a switch-back from GW2 to GW1. On the contrary, the Um of GW1 must fall down all the way to a reverse switch-back threshold, (hereinafter "GW1 TH2"), which is lower than GW1 TH1, to initiate the switch-back. This hysteresis can additionally reduce the number of switches in the system. Various implementations of system and methods in accordance with this disclosure can be configured to adjust the forward switch thresholds, and reverse switch-back hysteresis thresholds in accordance with seasonal variations, or detection of component aging, or detection of certain diversity switch frequency occurrences, or any combination or sub-combination thereof.

Figure 7:
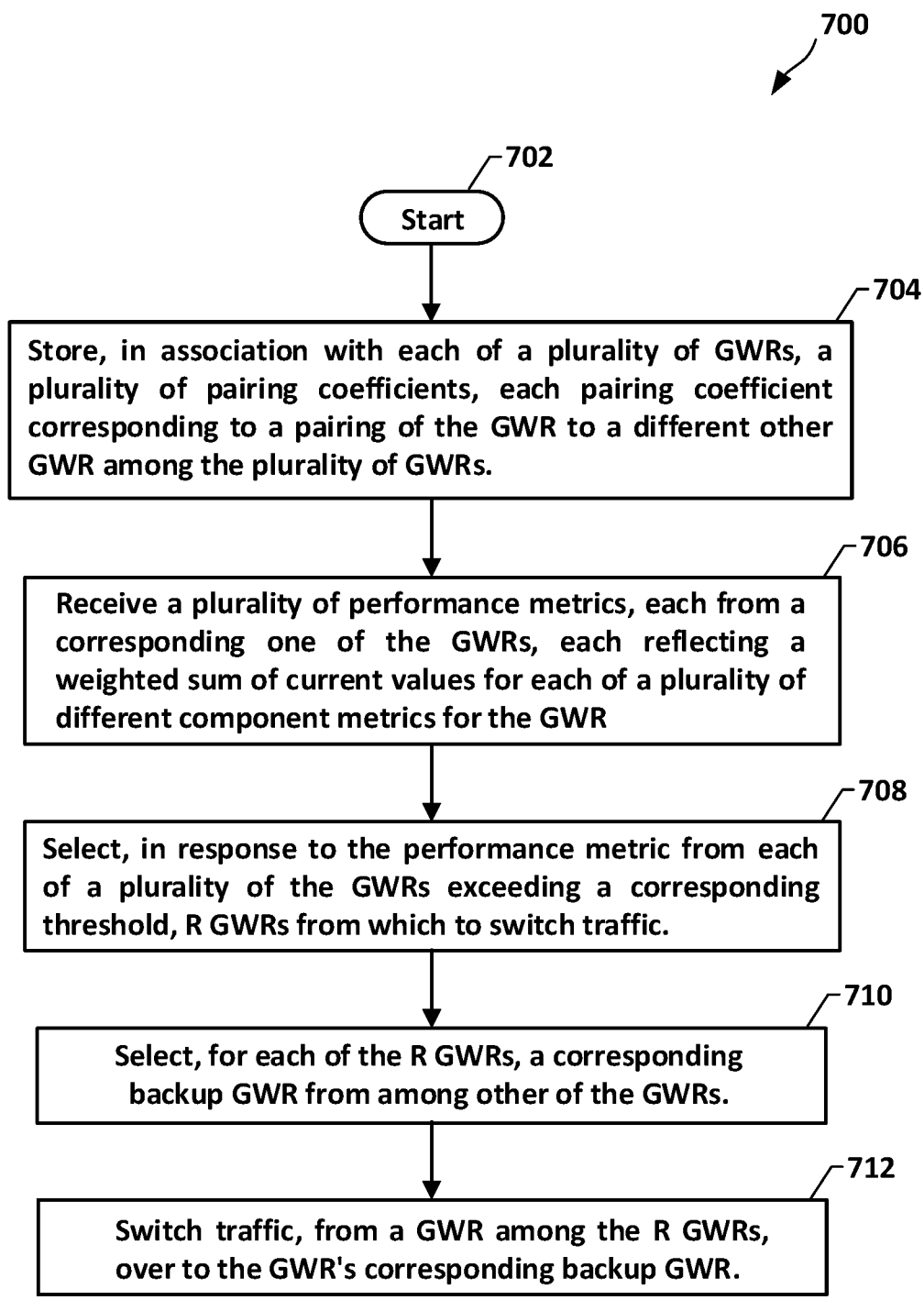
FIG. 7 is logic flow diagram of operations in one alternative process in a method for unavailability based, generic gateway switching according to the present disclosure.

FIG. 7 is logic flow diagram of operations in a flow 700 in one alternative process in a method for unavailability based, generic gateway switching according to the present disclosure. Operations in a process according to the flow 700 proceed from an arbitrary start at 702 to 704, where operations can store (e.g., in memory 210 of the FIG. 2 central diversity controller 202, or the FIG. 4 central diversity controller 402) in association with each of a plurality of GWRs, e.g., the FIG. 2 GWRs 204, a plurality of pairing coefficients, each of the pairing coefficients corresponding to a pairing of the GWR to a different other GWR among the plurality of GWRs. For example, operations at 704 can store pairing coefficients described in reference to Table 2 above. The flow 700 can proceed from 704 to 706 to receive a plurality of performance metrics, e.g., Um(GWR) each from a corresponding one of the GWRs. Each of Um(GWR) can reflect a weighted sum of current values for each of a plurality of different component metrics for the GWR. The flow 700 can proceed to 708 and, in response to the received performance metric from each of a plurality of the GWRs exceeding a corresponding threshold, can select R GWRs from which to switch traffic, R being an integer. Operations at 710, which can be merged with 708, can select, for each of the R GWRs, a corresponding backup GWR from among other of the GWRs. Operations at 708 and 710 can be implemented, for example, as the above-described priority-based, or the above-described pairing coefficient based, or as the above described combination priority and pairing coefficient based.

The flow 700 can proceed from 710 to 712 and apply operations of switching traffic for the R GWRs over to each's selected backup GWR. Switching operations at 712 can include the delay switching, such as described in reference to FIG. 5. Additional operation in the flow 700, which are not explicitly visible in FIG. 7, can include reversal of 712, i.e., switch back from the backup GWRs to the primary GWRs. The switch back can be implemented, for example, as the above-described Um and B2P pairing coefficient based switch back. Switch back can also be implemented, without limitation, according to the above-described switch back without delay, switch and stay, or switch and stay for a certain duration.

Figure 8:
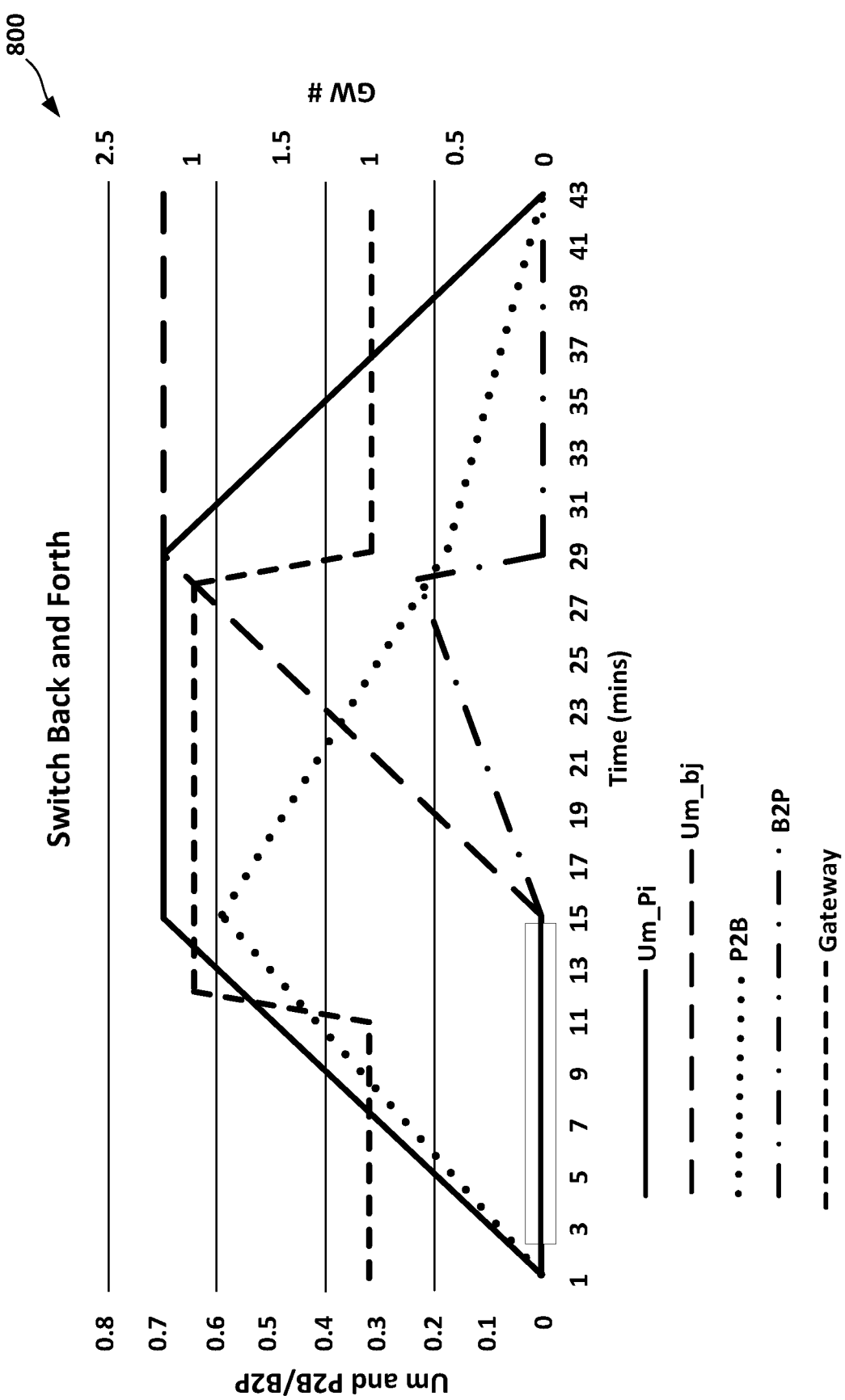
FIG. 8 is a time versus switching diagram overlaid with a superposition of different plots, each for a different example pairing coefficients, in a generic gateway switching system according to the present disclosure.

FIG. 8 is a time versus switching diagram 800 depicting an example change in the P2B and B2P coefficients with change in the unavailability metric associated with the backup GWRs and primary GWRs. In the diagram 800, a primary GWR is numbered as "1" and a backup GWR backup is numbered as "2." A switch can occur occurs from the primary GW1 to the backup GW2 at the 11th minute when the Um threshold (0.5) is exceeded. The switch back can occur when the coefficient falls below the desired threshold (0.25) to switch back. The Um on the backup GW2 can also changes during this time and its effect on the B2P is shown as well.

As described above, switch in and switch over of a gateway resource can include switching all traffic from a particular primary gateway to a single backup gateway. Implementations can also be provided, for example, to smart diversity or "N active" architecture, where switching in can include switching other than an entire traffic from one gateway to another. For example, depending on load, diversity for a given primary GW can be provided by sharing its traffic across multiple backup gateway resources.

Such sharing can be provided for frequency multiplexed gateway resources in a satellite communication system, for example, by implementing GWRs as carriers (frequency channels). The frequency channels can be time multiplexed, such that each carrier can be a time slot where a GW transmits. The above-described unavailability metric (Um), including its calculation, filtering, and prediction, as well as the described thresholds for switching, priority and pairing coefficient tables, can all be maintained independently for each of the different carriers. In this fashion, the carriers can be separately switched to different GWs or GWRs. In description above of features and operations relation to a number of GWs, the number of GWs can be replaced by the number of available carriers and the thresholds, and priority and pairing coefficients can be determined by whether the carriers are being used or not.

Implementations that can handle different carriers as separate entities can be extended to an M:N architecture as well. This can provide partitioning GWs into subsystems whose diversity switching can be tailored according to the subsystem parameters. This feature can be applicable to and can be provided, for example, to GWs operating on different frequency bands such as, but not limited to Ku, Ka, Q and V. Such diversity gateway implementations can provide diversity that can accommodate and take into consideration operating conditions, and therefore the unavailability metric, being different for different frequency bands.

Figure 9:
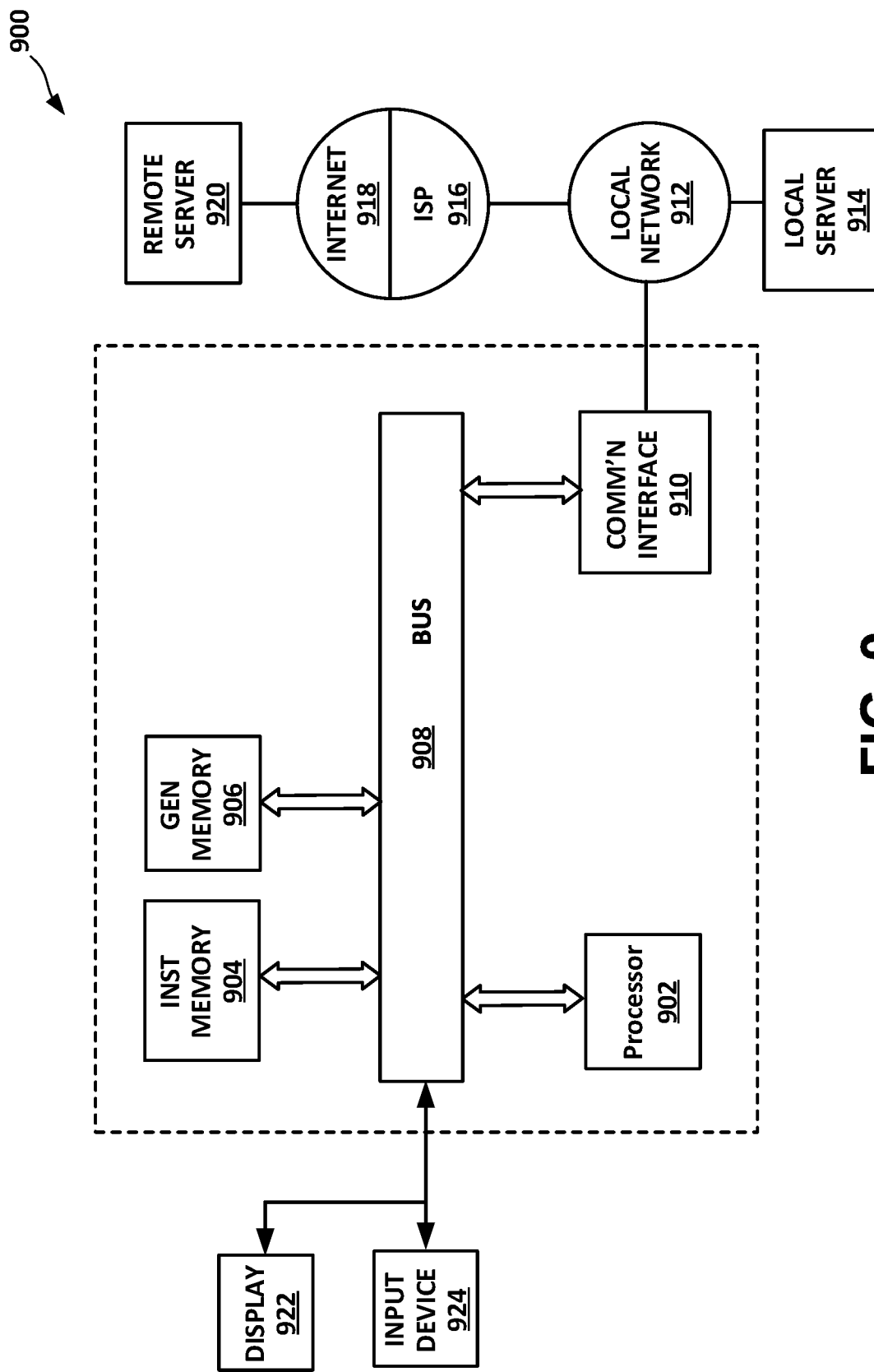
FIG. 9 is a functional block diagram of an example computer system upon which aspects of this disclosure may be implemented.

FIG. 9 is a functional block diagram of an example computer system upon which aspects of this disclosure may be implemented such as, but not limited to, particular function blocks and processes described in reference to FIGS. 2-8. It will be understood that logic blocks illustrated in FIG. 9 represent functions, and do not necessarily correspond to particular hardware on a one-to-one basis. The computer system 900 can include a data processor 902, instruction memory 904, and a general purpose memory 906, coupled by a bus 908. The instruction memory 904 can include a tangible medium retrievably storing computer-readable instructions, that when executed by the data processor 902 cause the processor to perform functions, processes, and operations described above.

The computer system 900 can include a communications interface 910, configured to interface with a local network 912 for accessing a local server 914, and to communicate through an Internet Service Provider (ISP) 916 to the Internet 918, and access a remote server 920. The computer system 900 can also include a display 922 and a user interface or other input device 924, either as separate devices or combined, for example, as a touchscreen display.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and is to be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracing of such subject matter is hereby disclaimed.

Except as expressly stated above, no statement herein is intended or should be interpreted to cause a dedication of any component, step, feature, object, benefit, advantage, or equivalent thereof to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system, comprising:
  a processor; and
  a memory, coupled to the processor, that stores executable instructions that, when executed by the processor, cause the processor to:
    store, in association with a backup GWR (gateway resource), a first P2B (primary to backup) pairing coefficient, and a second P2B pairing coefficient, the first P2B pairing coefficient corresponding to a first P2B pairing, from a first primary GWR to the backup GWR, and the second P2B pairing coefficient corresponding to a second P2B pairing, from a second primary GWR to the backup GWR, wherein a magnitude of the first P2B pairing coefficient and the second P2B pairing coefficient is a measure of system impact, including system performance costs, of switching from the first primary GWR and second primary GWR to the backup gateway resource;
    store, in association with the backup GWR, a first B2P (backup to primary to backup) pairing coefficient and a second B2P pairing coefficient, the first B2P pairing coefficient being indicative of a metric of switching from the backup GWR to the first primary GWR, and the second B2P pairing coefficient being indicative of a metric of switching from the backup GWR to the second primary GWR, wherein a magnitude of the first B2P pairing coefficient and the second B2B pairing coefficient is a measure of system impact, including system performance costs, of switching from the backup GWR to the first primary GWR and to second primary GWR;
    receive a first unavailability metric and a second unavailability metric, from the first primary GWR and the second primary GWR, respectively, and a third unavailability metric from the backup GWR;
    select, responsive at least in part to a conjunction of the first unavailability metric and the second unavailability metric exceeding respective GWR thresholds, a selected P2B pairing among the first P2B pairing and the second P2B pairing, based at least partially on the first P2B pairing coefficient, the second P2B pairing coefficient, the first B2P pairing coefficient, and the second B2P pairing coefficient; and
    switch a traffic to the backup GWR from the one among the first primary GWR and second primary GWR that corresponds to the selected P2B pairing.

2. The system of claim 1, wherein the first P2B pairing coefficient is indicative of a metric of switching according to the first P2B pairing, and the second P2B pairing coefficient is indicative of a metric of switching according to the second P2B pairing.

3. The system of claim 1, wherein:
  the first primary GWR is a first primary channel, and the second primary GWR is a second primary channel, the first primary channel being carried by at least one gateway, and the second primary channel being carried by at least one gateway,
  the backup GWR is a backup channel, carried by at least one gateway, and
  the first P2B pairing coefficient and the second P2B pairing coefficient have a relation indicative of system performance impact of a switch over from the first primary channel to the backup channel in comparison to system performance impact of a switch over from the second primary channel to the backup channel.

4. The system of claim 1, wherein:
to switch the traffic to the backup GWR includes to determine a reverse switch-back hysteresis threshold,
based on the selected P2B pairing being the first P2B pairing, the reverse switch-back hysteresis threshold is less than a first forward switch threshold, and
based on the selected P2B pairing being the second P2B pairing, the reverse switch-back hysteresis threshold is less than a second forward switch threshold.

5. The system of claim 4, wherein the executable instructions further include instructions that, when executed by the processor, cause the processor to:
adjust the reverse switch-back hysteresis threshold in accordance with seasonal variations, or detection of component aging, or detection of certain diversity switch frequency occurrences, or any combination or sub-combination thereof.

6. The system of claim 1, wherein:
the first unavailability metric is based at least partially on a capacity metric of the first primary GWR, a coverage metric of the first primary GWR, or a fade metric of the first primary GWR, or any combination or sub-combination thereof, and
the second unavailability metric is based at least partially on a capacity metric of the second primary GWR, a coverage metric of the second primary GWR, a fade metric of the second primary GWR, or any combination or sub-combination thereof.

7. The system of claim 1, wherein the executable instructions further include instructions that, when executed by the processor, cause the processor to:
assign a first priority coefficient to the first primary GWR and a second priority coefficient to the second primary GWR,
wherein:
to select the selected P2B pairing is further based at least partially on a relative magnitude of the first priority coefficient and the second priority coefficient.

8. The system of claim 7, wherein to select the selected P2B pairing is further based at least partially on relative magnitude of the first P2B pairing coefficient weighted by the first priority coefficient and the second P2B pairing coefficient weighted by the second priority coefficient.

9. The system of claim 1, wherein the backup GWR is a first backup GWR, and the selected P2B pairing is a first priority P2B pairing, and wherein the executable instructions further include instructions that, when executed by the processor, cause the processor to:
store a third P2B pairing coefficient, corresponding to a third P2B pairing, a fourth P2B pairing coefficient, corresponding to a fourth P2B pairing, a third B2P pairing coefficient, and a fourth B2P pairing coefficient, the third P2B pairing being from the first primary GWR to a second backup GWR, and the fourth P2B pairing being from the second primary GWR to the second backup GWR; and
receive a fourth unavailability metric, from the second backup GWR,
wherein to select the first priority P2B pairing is among a selecting of the first priority P2B pairing and a second priority P2B pairing and is based at least partially on a comparing of a sum of the first P2B pairing coefficient and the fourth P2B pairing coefficient to a sum of the second P2B pairing coefficient and the third P2B pairing coefficient.

10. A method, comprising:
storing, in association with a backup GWR (gateway resource), a first P2B (primary to backup) pairing coefficient, a second P2B pairing coefficient, a first B2P (backup to primary to backup) pairing coefficient, and a second B2P pairing coefficient, wherein:
the first P2B pairing coefficient corresponds to a first P2B pairing, from a first primary GWR to the backup GWR, and the second P2B pairing coefficient corresponds to a second P2B pairing, from a second primary GWR to the backup GWR, wherein a magnitude of the first P2B pairing coefficient and the second P2B pairing coefficient is a measure of system impact, including system performance costs, of switching from the first primary GWR and second primary GWR to the backup gateway resource, and
the first B2P pairing coefficient is indicative of a metric of switching from the backup GWR to the first primary GWR, and the second B2P pairing coefficient is indicative of a metric of switching from the backup GWR to the second primary GWR;
receiving a first unavailability metric and a second unavailability metric, from the first primary GWR and the second primary GWR, respectively, and a third unavailability metric from the backup GWR;
selecting, responsive at least in part to a conjunction of the first unavailability metric and the second unavailability metric exceeding respective GWR thresholds, a selected P2B pairing among the first P2B pairing and the second P2B pairing, based at least partially on the first P2B pairing coefficient, the second P2B pairing coefficient, the first B2P pairing coefficient, and the second B2P pairing coefficient; and
switching a traffic to the backup GWR from the one among the first primary GWR and second primary GWR that corresponds to the selected P2B pairing.

11. The method of claim 10, wherein the first P2B pairing coefficient is indicative of a metric of switching according to the first P2B pairing, and the second P2B pairing coefficient is indicative of a metric of switching according to the second P2B pairing.

12. The method of claim 10, wherein:
the first primary GWR is a first primary channel, and the second primary GWR is a second primary channel, the first primary channel being carried by at least one gateway, and the second primary channel being carried by at least one gateway,
the backup GWR is a backup channel, carried by at least one gateway, and
the first P2B pairing coefficient and the second P2B pairing coefficient have a comparative relation indicative of a comparison of system performance impact of a switch over from the first primary channel to the backup channel to system performance impact of a switch over from the second primary channel to the backup channel.

13. The method of claim 10, wherein:
switching the traffic to the backup GWR includes determining a reverse switch-back hysteresis threshold,
the reverse switch-back hysteresis threshold, when the selected P2B pairing is the first P2B pairing, is less than a first forward switch threshold, and the reverse switch-back hysteresis threshold, when the selected P2B pairing is the second P2B pairing, is less than a second forward switch threshold.

14. The method of claim 13 wherein the method further includes:
adjusting the reverse switch-back hysteresis threshold in accordance with seasonal variations, or detection of component aging, or detection of certain diversity switch frequency occurrences, or any combination or sub-combination thereof.

15. The method of claim 10, wherein:
the first unavailability metric is based at least partially on a capacity metric of the first primary GWR, a coverage metric of the first primary GWR, or a fade metric of the first primary GWR, or any combination or sub-combination thereof, and
the second unavailability metric is based at least partially on a capacity metric of the second primary GWR, a coverage metric of the second primary GWR, a fade metric of the second primary GWR, or any combination or sub-combination thereof.

16. The method of claim 10, wherein the method further includes assigning a first priority coefficient to the first primary GWR and a second priority coefficient to the second primary GWR,
wherein selecting the selected P2B pairing is further based at least partially on a relative magnitude of the first priority coefficient and the second priority coefficient.

17. The method of claim 16, wherein selecting the selected P2B pairing is further based at least partially on relative magnitude of the first P2B pairing coefficient weighted by the first priority coefficient and the second P2B pairing coefficient weighted by the second priority coefficient.

18. The method of claim 10, wherein the backup GWR is a first backup GWR, and the selected P2B pairing is a first priority P2B pairing, and wherein the method further comprises:
storing a third P2B pairing coefficient, corresponding to a third P2B pairing, a fourth P2B pairing coefficient, corresponding to a fourth P2B pairing, a third B2P pairing coefficient, and a fourth B2P pairing coefficient, the third P2B pairing being from the first primary GWR to a second backup GWR, and the fourth P2B pairing being from the second primary GWR to the second backup GWR; and
receiving a fourth unavailability metric, from the second backup GWR,
wherein:
selecting the first priority P2B pairing is among the first priority P2B pairing and a second priority P2B pairing and is based at least partially on a comparing of a sum of the first P2B pairing coefficient and the fourth P2B pairing coefficient to a sum of the second P2B pairing coefficient and the third P2B pairing coefficient.

19. A system, comprising: a processor; and a memory, coupled to the processor, that stores executable instructions that, when executed by the processor, cause the processor to:
store, in association with each of a plurality of GWRs (gateway resources), a plurality of pairing coefficients, each of the pairing coefficients corresponding to a pairing of the GWR to a different other GWR among the plurality of GWRs, wherein a magnitude of the pairing coefficient is a measure of system impact, including system performance costs, of switching from a primary gateway to a backup gateway;
wherein the plurality of pairing coefficients include: a first P2B (primary to backup) pairing coefficient, and a second P2B pairing coefficient, the first P2B pairing coefficient corresponding to a first P2B pairing, from a first primary GWR to the backup GWR, and the second P2B pairing coefficient corresponding to a second P2B pairing, from a second primary GWR to the backup GWR, wherein a magnitude of the first P2B pairing coefficient and the second P2B pairing coefficient is a measure of system impact, including system performance costs, of switching from the first primary GWR and second primary GWR to the backup gateway resource;
wherein the plurality of pairing coefficients further include: a first B2P (backup to primary to backup) pairing coefficient and a second B2P pairing coefficient, the first B2P pairing coefficient being indicative of a metric of switching from the backup GWR to the first primary GWR, and the second B2P pairing coefficient being indicative of a metric of switching from the backup GWR to the second primary GWR, wherein a magnitude of the first B2P pairing coefficient and the second B2B pairing coefficient is a measure of system impact, including system performance costs, of switching from the backup GWR to the first primary GWR and second primary GWR;
receive a plurality of performance metrics, each from a corresponding one of the GWRs, each received performance metric reflecting a weighted sum of current values for each of a plurality of different component metrics for the GWR;
select, in response to the received performance metric from each of a plurality of the GWRs exceeding a corresponding threshold, R GWRs from which to switch traffic, R being an integer;
select, for each of the R GWRs, a corresponding backup GWR from among other of the GWRs; and
switch traffic, from a GWR among the R GWRs, over to the GWR's corresponding backup GWR,
wherein:
to select, for each of the R GWRs, its corresponding backup GWR is based at least in part on a comparison of the pairing coefficient for the pairing of the GWR to its corresponding backup GWR in relation to the pairing of the GWR to other of the GWRs.

20. The system of claim 19, wherein the executable instructions further include instructions that, when executed by the processor, cause the processor, after switching traffic from GWRs among the plurality of the R GWRs to corresponding backup GWRs, R being an integer, to:
select one of the corresponding backup GWRs to which traffic was switched, for switch over back to the GWR from which the traffic was switched, based at least in part on the pairing coefficient of a pairing from the backup GWR to the GWR from which the traffic was switched.

* * * * *